US012571898B2

(12) United States Patent
Wang et al.

(10) Patent No.: US 12,571,898 B2
(45) Date of Patent: Mar. 10, 2026

(54) SYSTEMS AND METHODS FOR USING ULTRAWIDEBAND AUDIO SENSING SYSTEMS

(71) Applicants: The Regents of the University of California, Oakland, CA (US); Nanyang Technological University, Singapore (SG)

(72) Inventors: Ziqi Wang, San Diego, CA (US); Mani Srivastava, Sherman Oaks, CA (US); Akash Deep Singh, Austin, TX (US); Luis Garcia, Midvale, UT (US); Zhe Chen, Singapore (SG); Jun Luo, Singapore (SG)

(73) Assignees: The Regents of the University of California, Oakland, CA (US); Nanyang Technological University, Singapore (SG)

( * ) Notice: Subject to any disclaimer, the term of this patent is extended or adjusted under 35 U.S.C. 154(b) by 497 days.

(21) Appl. No.: 18/055,772

(22) Filed: Nov. 15, 2022

(65) Prior Publication Data

US 2023/0288549 A1     Sep. 14, 2023

Related U.S. Application Data

(60) Provisional application No. 63/264,079, filed on Nov. 15, 2021.

(51) Int. Cl.
*G01S 13/02* (2006.01)
*G01S 7/28* (2006.01)
(Continued)

(52) U.S. Cl.
CPC ........ *G01S 13/0209* (2013.01); *G01S 7/2813* (2013.01); *G01S 7/2923* (2013.01); *G01S 7/414* (2013.01); *G01S 13/888* (2013.01)

(58) Field of Classification Search
CPC combination set(s) only.
See application file for complete search history.

(56) References Cited

U.S. PATENT DOCUMENTS 7,391,819 B1 *  6/2008  von der Embse ...... H04L 27/00
                                                   375/295
12,272,375 B2 *  4/2025  Ozturk .................. H04W 4/021
                         (Continued)

OTHER PUBLICATIONS

"Dcase: Sound event detection in domestic environments", Retrieved from https://dcase.community/challenge2019/task-sound-event-detection-in-domestic-environments, retrieved on Feb. 20, 2025, 12 pgs.

(Continued)

*Primary Examiner* — Vladimir Magloire
*Assistant Examiner* — Eric K Hodac
(74) *Attorney, Agent, or Firm* — KPPB LLP

(57) ABSTRACT

Systems and methods for simultaneously recovering and separate sounds from multiple sources using Impulse Radio Ultra-Wideband (IR-UWB) signals are described. In one embodiment, a device can be configured for generating an audio signal based on audio source ranging using ultrawideband signals. In an embodiment the device includes, a transmitter circuitry, a receiver circuitry, memory and a processor. The processor configured to generate a radio signal. The radio signal including an ultra-wideband Gaussian pulse modulated on a radio-frequency carrier. The processor further configured to transmit the radio signal using the transmitter circuitry, receive one or more backscattered signals at the receiver circuitry, demodulate the one or more backscattered signals to generate one or more baseband signals, and generate a set of data frames based on the one or more baseband signals.

28 Claims, 10 Drawing Sheets

(51) Int. Cl.
    *G01S 7/292* (2006.01)
    *G01S 7/41* (2006.01)
    *G01S 13/88* (2006.01)

(56) References Cited

U.S. PATENT DOCUMENTS

2022/0292888 A1* 9/2022 Reiter ................. G06F 11/3476
2023/0003835 A1* 1/2023 Rong ...................... G01S 7/415

OTHER PUBLICATIONS

"WARP v3 User Guide: RF Interfaces", Retrieved from https://warpproject.org/trac/wiki/HardwareUsersGuides/WARPv3/RF, retrieved on Feb. 18, 2025, 3 pgs.

Abdel-Hamid et al., "Convolutional Neural Networks for Speech Recognition", IEEE/ACM Transactions on Audio, Speech, and Language Processing, vol. 22, No. 10, Oct. 2014, pp. 1533-1545, doi: 10.1109/TASLP.2014.2339736.

Abowd et al., "Towards a Better Understanding of Context and Context-Awareness", HUC '99: Proceedings of the 1st international symposium on Handheld and Ubiquitous Computing, Jan. 1999, pp. 304-307, doi: 10.1007/3-540-48157-5_29.

Ahmad et al., "CarMap: Fast 3D Feature Map Updates for Automobiles", Proceedings of the 17th USENIX Symposium on Networked Systems Design and Implementation (NSDI '20), Feb. 25-27, 2020, Santa Clara, CA, pp. 1063-1081.

Alanwar et al., "D-SLATS: Distributed Simultaneous Localization and Time Synchronization", Mobihoc '17: Proceedings of the 18th ACM International Symposium on Mobile Ad Hoc Networking and Computing, Jul. 10-14, 2017, 10 pgs., doi: 10.1145/3084041.3084049.

Amodei et al., "Deep Speech 2 : End-to-End Speech Recognition in English and Mandarin", Proceedings of the 33rd International Conference on Machine Learning, vol. 48, 2016, pp. 173-182.

Andersen et al., "A 118-mW Pulse-Based Radar SoC in 55-nm CMOS for Non-Contact Human Vital Signs Detection", IEEE Journal of Solid-State Circuits, vol. 52, No. 12, Dec. 2017, pp. 3421-3433, doi: 10.1109/JSSC.2017.2764051.

Benedetto et al., "UWB Communication Systems: A Comprehensive Overview", EURASIP Book Series on Signal Processing and Communications, vol. 5, 2006, 506 pgs. (Presented in 2 Parts).

Bengio et al., "Representation Learning: A Review and New Perspectives", IEEE Transactions on Pattern Analysis and Machine Intelligence, vol. 35, No. 8, Aug. 2013, pp. 1798-1828, doi: 10.1109/TPAMI.2013.50.

Berouti et al., "Enhancement of Speech Corrupted by Acoustic Noise", ICASSP'79, IEEE International Conference on Acoustics, Speech, and Signal Processing, vol. 4, Apr. 2-4, 1979, pp. 208-211, doi: 10.1109/ICASSP.1979.1170788.

Boll, Steven F. "A Spectral Subtraction Algorithm for Suppression of Acoustic Noise in Speech", ICASSP '79, IEEE International Conference on Acoustics, Speech, and Signal Processing, Apr. 2-4, 1979, pp. 200-203, doi: 10.1109/ICASSP.1979.1170696.

Cai et al., "AcuTe: Acoustic Thermometer Empowered by a Single Smartphone", SenSys '20: Proceedings of the 18th Conference on Embedded Networked Sensor Systems, Nov. 16-19, 2020, pp. 28-41, doi: 10.1145/3384419.3430714.

Chen et al., "Bathroom Activity Monitoring Based on Sound", International Conference on Pervasive Computing, May 8-13, 2005, pp. 47-61, doi: 10.1007/11428572_4.

Chen et al., "ResNet and Model Fusion for Automatic Spoofing Detection", Interspeech, Aug. 20-24, 2017, pp. 102-106, doi: 10.21437/Interspeech.2017-1085.

Chen et al., "Robust Deep Feature for Spoofing Detection—The SJTU System for ASV spoof 2015 Challenge", Sixteenth Annual Conference of the International Speech Communication Association, Sep. 6-10, 2015, pp. 2097-2101.

Cheng et al., "Wide & Deep Learning for Recommender Systems", Proceedings of the 1st Workshop on Deep Learning for Recommender Systems, Sep. 15, 2016, pp. 7-10, doi: 10.1145/2988450.2988454.

Davis et al., "The Visual Microphone: Passive Recovery of Sound from Video", Journal of ACM Transactions on Graphics, vol. 33, No. 4, Article 79, Jul. 2014, 10 pgs.

Dekkers et al., "The Sins Database for Detection of Daily Activities in a Home Environment Using an Acoustic Sensor Network", Proceedings of the Detection and Classification of Acoustic Scenes and Events, Nov. 16, 2017, pp. 32-36.

Dhekne et al., "LiquID: A Wireless Liquid IDentifier", MobiSys '18: Proceedings of the 16th Annual International Conference on Mobile Systems, Applications, and Services, Jun. 10-15, 2018, pp. 442-454, doi: 10.1145/3210240.3210345.

Ding et al., "RF-Net: A Unified Meta-Learning Framework for RF-enabled One-Shot Human Activity Recognition", SenSys '20: Proceedings of the 18th Conference on Embedded Networked Sensor Systems, Nov. 16-19, 2020, pp. 517-530, doi: 10.1145/3384419.3430735.

Donahue et al., "Exploring Speech Enhancement with Generative Adversarial Networks for Robust Speech Recognition", Proceedings of IEEE International Conference on Acoustics, Speech and Signal Processing (ICASSP), Apr. 15-20, 2018, pp. 5024-5028.

Dotlic et al., "Angle of Arrival Estimation Using Decawave DW1000 Integrated Circuits", Proceedings of 14th Workshop on Positioning, Navigation and Communications (WPNC), Oct. 25-26, 2017, 6 pgs., doi: 10.1109/WPNC.2017.8250079.

Esteva et al., "Dermatologist-level classification of skin cancer with deep neural networks", Nature, vol. 542, No. 7639, Feb. 2, 2017, pp. 115-118, doi: 10.1038/nature21056.

Evans et al., "Spoofing and countermeasures for automatic speaker verification", Interspeech, Aug. 25-29, 2013, pp. 925-929.

Germain et al., "Speech Denoising with Deep Feature Losses", arXiv:1806.10522v2 [eess.AS], Sep. 14, 2018, pp. 1-6.

Goodfellow et al., "Deep Learning", The MIT Press, Cambridge, Massachusetts, 2016, 66 pgs.

Griffin et al., "Localizing multiple audio sources in a wireless acoustic sensor network", Journal of Signal Processing, vol. 107, Feb. 2015, pp. 54-67, doi: 10.1016/j.sigpro.2014.08.013.

He et al., "Deep Residual Learning for Image Recognition", Proceedings of the IEEE Conference on Computer Vision and Pattern Recognition, 2016, pp. 770-778, doi: 10.1109/CVPR.2016.90.

He et al., "Delving Deep into Rectifiers: Surpassing Human-Level Performance on ImageNet Classification", Proceedings of the IEEE International Conference on Computer Vision, Dec. 7-13, 2015, pp. 1026-1034.

Hollosi et al., "Voice Activity Detection Driven Acoustic Event Classification for Monitoring in Smart Homes", 3rd International Symposium on Applied Sciences in Biomedical and Communication Technologies (ISABEL 2010), 5 pgs., Nov. 7-10, 2010, doi: 10.1109/ISABEL.2010.5702763.

Huang et al., "WaveNet Vocoder and its Applications in Voice Conversion", Conference on Computational Linguistics and Speech Processing ROCLING, 2018, pp. 96-110.

Ioffe et al., "Batch Normalization: Accelerating Deep Network Training by Reducing Internal Covariate Shift", arXiv:1502.03167v3 [cs.LG], Mar. 2, 2015, pp. 1-11.

Jiménez et al., "Comparing Decawave and Bespoon UWB location systems: indoor/outdoor performance analysis", International Conference on Indoor Positioning and Indoor Navigation (IPIN), Oct. 4-7, 2016, 8 pgs., doi: 10.1109/IPIN.2016.7743686.

Juvela et al., "Speech Waveform Synthesis from MFCC Sequences with Generative Adversarial Networks", IEEE International Conference on Acoustics, Speech and Signal Processing (ICASSP), Apr. 15-20, 2018, pp. 5679-5683, doi: 10.1109/ICASSP.2018.8461852.

Kamath et al., "A Multi-band Spectral Subtraction Method for Enhancing Speech Corrupted by Colored Noise", IEEE International Conference on Acoustics Speech and Signal Processing, vol. 4, May 13, 2002, pg. IV-4164, doi: 10.1109/icassp.2002.5745591.

(56)  References Cited

OTHER PUBLICATIONS

Kavalerov et al., "Universal Sound Separation", IEEE Workshop on Applications of Signal Processing to Audio and Acoustics (WASPAA), Oct. 20-23, 2019, pp. 175-179, doi: 10.1109/WASPAA.2019. 8937253.

Kervel, Fredrik "X4driver example for raspbian", Retrieved from https://github.com/novelda/Legacy-SW/tree/master/Examples/X4Driver_RaspberryPi, retrieved on Feb. 18, 2025, 3 pgs.

Kervel, Fredrik "XeThru X4 Phase Noise Correction", Retrieved from https://github.com/novelda/Legacy-Documentation/blob/master/Application-Notes/XTAN-14_XeThru_X4_Phase_Noise_Correction_rev_a.pdf, Date Published—Sep. 27, 2018, 9 pgs.

Kervel, Fredrik "XeThru X4 Radar User Guide", Retrieved from https://github.com/novelda/Legacy-Documentation/blob/master/Application-Notes/XTAN-13_XeThruX4RadarUserGuide_rev_a.pdf, Date Published—Sep. 25, 2018, 13 pgs.

Kingma et al., "Adam: A Method for Stochastic Optimization", arXiv:1412.6980v1 [cs.LG], Dec. 22, 2014, 9 pgs.

Kinnunen et al., "ASVspoof 2017: Automatic Speaker Verification Spoofing and Countermeasures Challenge Evaluation Plan", Retrieved from https://www.researchgate.net/publication/364279170_ASVspoof_2017_Automatic_Speaker_Verification_Spoofing_and_Countermeasures_Challenge_Evaluation_Plan, Date Published—Sep. 19, 2018, pp. 1-6.

Kinnunen et al., "t-DCF: a Detection Cost Function for the Tandem Assessment of Spoofing Countermeasures and Automatic Speaker Verification", arXiv:1804.09618v1 [eess.AS], Apr. 25, 2018, 8 pgs.

Kshetrimayum, Rakhesh S. "An introduction to UWB communication systems", IEEE Potentials, vol. 28, No. 2, Mar.-Apr. 2009, pp. 9-13.

Kwong et al., "Hard Drive of Hearing: Disks that Eavesdrop with a Synthesized Microphone", IEEE Symposium on Security and Privacy (SP), May 19-23, 2019, pp. 905-919, doi: 10.1109/SP.2019. 00008.

Lavrentyeva, "Audio replay attack detection with deep learning frameworks", Interspeech, Aug. 20-24, 2017, pp. 82-86, doi: 10.21437/Interspeech.2017-360.

Lewis et al., "Effects of Noise on Speech Recognition and Listening Effort in Children With Normal Hearing and Children With Mild Bilateral or Unilateral Hearing Loss", Journal of Speech, Language, and Hearing Research, vol. 59, No. 5, Oct. 2016, pp. 1218-1232, doi: 10.1044/2016_JSLHR-H-15-0207.

Li et al., "An Overview of Noise-Robust Automatic Speech Recognition", IEEE/ACM Transactions on Audio, Speech, and Language Processing, vol. 22, No. 4, Apr. 2014, pp. 745-777.

Liang et al., "Ultra-Wideband Impulse Radar Through-Wall Detection of Vital Signs", Scientific Reports, vol. 8, No. 13367, Sep. 6, 2018, pp. 1-21, doi: 10.1038/s41598-018-31669-y.

Liu et al., "Design of Low-Power, 1GS/s Throughput FFT Processor for MIMO-OFDM UWB Communication System", IEEE International Symposium on Circuits and Systems (ISCAS), May 27-30, 2007, pp. 2594-2597, doi: 10.1109/ISCAS.2007.377846.

Lorenzo-Trueba et al., "The Voice Conversion Challenge 2018: Promoting Development of Parallel and Nonparallel Methods", arXiv:1804.04262v1 [eess.AS], Apr. 12, 2018, 10 pgs.

McFee et al., "librosa: Audio and Music Signal Analysis in Python", Proceedings of the 14th python in science conference, vol. 8, 2015, pp. 18-25.

Mesaros et al., "TUT Database for Acoustic Scene Classification and Sound Event Detection", 24th European Signal Processing Conference (EUSIPCO), Aug. 29, 2016-Sep. 2, 2016, pp. 1128-1132, doi: 10.1109/EUSIPCO.2016.7760424.

Miller, Dan "Voice Biometrics Census: Steady Growth of Global Enrollments", Retrieved from https://www.nuance.com/content/dam/nuance/en_au/collateral/enterprise/report/ar-opus-vb-census-en-US.pdf?srsltid=AfmBOooQvPKR_olRILMaT5cbiPvhJh7c-AQloxb-q7Vi3eZ-e57hEMJr, Date Published—Sep. 2016, pp. 1-16.

Nachmani et al., "Voice Separation with an Unknown Number of Multiple Speakers", arXiv:2003.01531v4 [eess.AS], Sep. 1, 2020, 12 pgs.

Nandakumar et al., "Contactless Sleep Apnea Detection on Smartphones", MobiSys '15: Proceedings of the 13th Annual International Conference on Mobile Systems, Applications, and Services, May 18, 2015, pp. 45-57, doi: 10.1145/2742647.2742674.

Nguyen et al., "Energy intelligent buildings based on user activity: A survey", Energy and Buildings, vol. 56, Jan. 2013, pp. 244-257, doi: 10.1016/j.enbuild.2012.09.005.

Nishikawa et al., "Blind Source Separation of Acoustic Signals Based on Multistage ICA Combining Frequency-Domain ICA and Time-Domain ICA", IEICE Transactions on Fundamentals of Electronics, Communications and Computer Sciences, vol. E86-A, No. 4, Apr. 1, 2003, pp. 846-858.

Oord et al., "Wavenet: A Generative Model for Raw Audio", arXiv:1609.03499v2 [cs.SD], Sep. 19, 2016, pp. 1-15.

Paszke et al., "Automatic differentiation in PyTorch", 31st Conference on Neural Information Processing Systems (NIPS), 2017, pp. 1-4.

Pavlidi et al., "Real-Time Multiple Sound Source Localization and Counting Using a Circular Microphone Array", IEEE Transactions on Audio, Speech, and Language Processing, vol. 21, No. 10, Oct. 2013, pp. 2193-2206, doi: 10.1109/TASL.2013.2272524.

Qiu et al., "AVR: Augmented Vehicular Reality", MobiSys '18: Proceedings of the 16th Annual International Conference on Mobile Systems, Applications, and Services, Jun. 10, 2018, pp. 81-95, doi: 10.1145/3210240.3210319.

Rajagopal et al., "Demo Abstract: Welcome to My World: Demystifying Multi-User AR with the Cloud", 17th ACM/IEEE International Conference on Information Processing in Sensor Networks (IPSN), Apr. 11-13, 2018, pp. 146-147, doi: 10.1109/IPSN.2018.00036.

Rajpurkar et al., "Cardiologist-Level Arrhythmia Detection with Convolutional Neural Networks", arXiv: 1707.01836v1 [cs.CV], Jul. 6, 2017, 9 pgs.

Reiff, Christian G. "Acoustic Source Localization and Cueing from an Aerostat during the NATO SET-093 Field Experiment", Proceedings of SPIE, vol. 7333, Unattended Ground, Sea, and Air Sensor Technologies and Applications XI, 73330M, May 5, 2009, 10 pgs., doi: 10.1117/12.818568.

Rethage et al., "A Wavenet for Speech Denoising", IEEE International Conference on Acoustics, Speech and Signal Processing (ICASSP), Apr. 15-20, 2018, pp. 5069-5073, doi: 10.1109/ICASSP. 2018.8462417.

Reynolds et al., "Robust Text-Independent Speaker Identification Using Gaussian Mixture Speaker Models", IEEE Transactions on Speech and Audio Processing, vol. 3, No. 1, Jan. 1995, pp. 72-83, doi: 10.1109/89.365379.

Reynolds et al., "Speaker Verification Using Adapted Gaussian Mixture Models", Digital Signal Processing, vol. 10, No. 1-3, Jan. 2000, pp. 19-41, doi: 10.1006/dspr.1999.0361.

Robjohns, Hugh "A brief history of microphones", Microphone Data Book, 2001, pp. 1-7.

Ruiz et al., "Comparing Ubisense, BeSpoon, and DecaWave UWB Location Systems: Indoor Performance Analysis", IEEE Transactions on Instrumentation and Measurement, vol. 66, No. 8, Aug. 2017, pp. 1-12, doi: 10.1109/TIM.2017.2681398.

Sabath et al., "Definition and Classification of Ultra-Wideband Signals and Devices", URSI Radio Science Bulletin, vol. 2005, No. 313, Jun. 2005, pp. 12-26, doi: 10.23919/URSIRSB.2005.7909522.

Saha et al., "Deep Convolutional Bidirectional LSTM for Complex Activity Recognition with Missing Data", Human Activity Recognition Challenge, Smart Innovation, Systems and Technologies, vol. 199, Nov. 21, 2020, pp. 39-53, doi: 10.1007/978-981-15-8269-1_4.

Salous et al., "Millimeter-Wave Propagation Characterization and modeling toward fifth-generation systems", IEEE Antennas and Propagation Magazine, vol. 58, No. 6, Dec. 1, 2016, pp. 115-127, doi: 10.1109/MAP.2016.2609815.

Sawada et al., "Blind Extraction of Dominant Target Sources Using ICA and Time-Frequency Masking", IEEE Transactions on Audio, Speech, and Language Processing, vol. 14, No. 6, Nov. 2006, pp. 2165-2173, doi: 10.1109/TASL.2006.872599.

Shojaei et al., "Effect of signal to noise ratio on the speech perception ability of older adults", Medical Journal of the Islamic Republic of Iran, vol. 30, Mar. 9, 2016, pp. 1-7.

(56) References Cited

OTHER PUBLICATIONS

Singh et al., "RadHAR: Human Activity Recognition from Point Clouds Generated through a Millimeter-wave Radar", mmNets '19: Proceedings of the 3rd ACM Workshop on Millimeter-wave Networks and Sensing Systems, Oct. 7, 2019, pp. 51-56, doi: 10.1145/3349624.3356768.

Srivastava et al., "Dropout: A Simple Way to Prevent Neural Networks from Overfitting", Journal of Machine Learning Research, vol. 15, No. 1, Jun. 1, 2014, pp. 1929-1958.

Stefanakis et al., "Perpendicular Cross-Spectra Fusion for Sound Source Localization with a Planar Microphone Array", IEEE/ACM Transactions on Audio, Speech, and Language Processing, vol. 25, No. 9, Sep. 2017, pp. 1821-1835, doi: 10.1109/TASLP.2017.2718733.

Szegedy et al., "Going Deeper with Convolutions", IEEE Conference on Computer Vision and Pattern Recognition (CVPR), Jun. 7-12, 2015, pp. 1-9, doi: 10.1109/CVPR.2015.7298594.

Tamai et al., "Three Ring Microphone Array for 3D Sound Localization and Separation for Mobile Robot Audition", IEEE/RSJ International Conference on Intelligent Robots and Systems, Aug. 2-6, 2005, pp. 4172-4177, doi: 10.1109/IROS.2005.1545095.

Thomas et al., "Revisiting Trilateration for Robot Localization", IEEE Transactions on Robotics, vol. 21, No. 1, Feb. 7, 2005, pp. 93-101, doi: 10.1109/TRO.2004.833793.

Toda et al., "The Voice Conversion Challenge 2016", Interspeech, Sep. 8-12, 2016, pp. 1632-1636, doi: 10.21437/Interspeech.2016-1066.

Todisco et al., "ASV spoof 2019: Future Horizons in Spoofed and Fake Audio Detection", Interspeech, Sep. 15-19, 2019, pp. 1008-1012, doi: 10.21437/Interspeech.2019-2249.

Todisco et al., "Constant Q cepstral coefficients: A spoofing countermeasure for automatic speaker verification", Computer Speech & Language, vol. 45, Sep. 2017, pp. 516-535, doi: 10.1016/j.csl.2017.01.001.

Turpault et al., "Sound Event Detection in Domestic Environments with Weakly Labeled Data and Soundscape Synthesis", Workshop on Detection and Classification of Acoustic Scenes and Events, Oct. 25-26, 2019, 5 pgs.

Tzinis et al., "Improving Universal Sound Separation Using Sound Classification", ICASSP 2020—2020 IEEE International Conference on Acoustics, Speech and Signal Processing (ICASSP), May 4-8, 2020, pp. 96-100, doi: 10.1109/ICASSP40776.2020.9053921.

Vacher et al., "Sound Detection and Classification for Medical Telesurvey", 2nd Conference on Biomedical Engineering, Feb. 2004, 5 pgs.

Valin et al., "Robust Sound Source Localization Using a Microphone Array on a Mobile Robot", IEEE/RSJ International Conference on Intelligent Robots and Systems (IROS 2003) (Cat. No.03CH37453), Oct. 27-31, 2003, pp. 1228-1233, doi: 10.1109/IROS.2003.1248813.

Venkatesh et al., "Implementation and Analysis of Respiration-rate Estimation Using Impulse-based UWB", IEEE Military Communications Conference, Oct. 17-20, 2005, pp. 3314-3320, doi: 10.1109/MILCOM.2005.1606167.

Villalba et al., "Spoofing Detection with DNN and One-class SVM for the ASVspoof 2015 Challenge", Sixteenth Annual Conference of the International Speech Communication Association, Interspeech, pp. 2067-2071, doi: 10.21437/Interspeech.2015-468.

Viswanathan et al., "Blind Navigation Proposal using Sonar", IEEE International Conference on Computer Graphics, Vision and Information Security (CGVIS), Nov. 2-3, 2015, pp. 151-156, doi: 10.1109/CGVIS.2015.7449912.

Wang, Qiaosong "Towards Real-time 3D Reconstruction using Consumer UAVs", 28th Workshop on Information Technologies and Systems, Dec. 16-18, 2018, arXiv:1902.09733, 7 pgs.

Wang et al., "Relative phase information for detecting human speech and spoofed speech", 16th Annual Conference of the International Speech Communication Association, Interspeech, Sep. 6-10, 2015, pp. 2092-2096.

Wang et al., "Syncope Detection in Toilet Environments Using Wi-Fi Channel State Information", UbiComp '18: Proceedings of the 2018 ACM International Joint Conference and 2018 International Symposium on Pervasive and Ubiquitous Computing and Wearable Computers, Oct. 8, 2018, pp. 287-290, doi: 10.1145/3267305.3267650.

Wang et al., "Target Classification and Localization in Habitat Monitoring", IEEE International Conference on Acoustics, Speech, and Signal Processing (ICASSP '03), Apr. 6-10, 2003, pp. 844-847, doi: 10.1109/ICASSP.2003.1202775.

Watanabe et al., "ESPnet: End-to-End Speech Processing Toolkit", Interspeech, Sep. 2-6, 2018, pp. 2207-2211, doi: 10.21437/Interspeech.2018-1456.

Wei et al., "Acoustic Eavesdropping through Wireless Vibrometry", MobiCom '15: Proceedings of the 21st Annual International Conference on Mobile Computing and Networking, Sep. 7, 2015, pp. 130-141, doi: 10.1145/2789168.2790119.

Wisdom et al., "What's All the Fuss About Free Universal Sound Separation Data?", arXiv:2011.00803v1, Nov. 2, 2020, 5 pgs.

Wu et al., "ASVspoof 2015: the First Automatic Speaker Verification Spoofing and Countermeasures Challenge", Sixteenth Annual Conference of the International Speech Communication Association, Interspeech, Sep. 2015, 5 pgs., doi: 10.21437/Interspeech.2015-462.

Wu et al., "Merlin: An Open Source Neural Network Speech Synthesis System", 9th ISCA Speech Synthesis Workshop, Sep. 13-15, 2016, pp. 202-207, doi: 10.21437/SSW.2016-33.

Xing et al., "DeepCEP: Deep Complex Event Processing Using Distributed Multimodal Information", IEEE International Conference on Smart Computing (Smartcomp), Jun. 12-15, 2019, pp. 87-92, doi: 10.1109/SMARTCOMP.2019.00034.

Xu et al., "WaveEar: Exploring a mmWave-based Noise-resistant Speech Sensing for Voice-User Interface", MobiSys '19: Proceedings of the 17th Annual International Conference on Mobile Systems, Applications, and Services, Jun. 17-21, 2019, pp. 14-26, doi: 10.1145/3307334.3326073.

Yamagishi et al., "ASVspoof 2019: Automatic Speaker Verification Spoofing and Countermeasures Challenge Evaluation Plan", Retrieved from https://www.asvspoof.org/asvspoof2019/asvspoof2019_evaluation_plan.pdf, Date Published—Jan. 15, 2019, pp. 1-19.

Yang et al., "Making Sense of Mechanical Vibration Period with Sub-millisecond Accuracy Using Backscatter Signals", MobiCom '16: Proceedings of the 22nd Annual International Conference on Mobile Computing and Networking, Oct. 3, 2016, pp. 16-28, doi: 10.1145/2973750.2973759.

Ye et al., "Urban sound event classification based on local and global features aggregation", Applied Acoustics, vol. 117, Feb. 2017, 11 pgs., doi: 10.1016/j.apacoust.2016.08.002.

Zavarehei, Esfandiar "Berouti Spectral Subtraction", Retrieved from https://in.mathworks.com/matlabcentral/fileexchange/7653-berouti-spectral-subtraction, retrieved on Feb. 18, 2025, 3 pgs.

Zavarehei, Esfandiar "Boll Spectral Subtraction", Retrieved from https://in.mathworks.com/matlabcentral/fileexchange/7675-boll-spectral-subtraction, retrieved on Feb. 18, 2025, 3 pgs.

Zavarehei, Esfandiar "Multi-band Spectral Subtraction", Retrieved from https://in.mathworks.com/matlabcentral/fileexchange/7674-multi-band-spectral-subtraction, retrieved on Feb. 18, 2025, 3 pgs.

Zhang et al., "Accurate UWB Indoor Localization System Utilizing Time Difference of Arrival Approach", IEEE Radio and Wireless Symposium, Oct. 17-19, 2006, pp. 515-518, doi: 10.1109/RWS.2006.1615207.

Zhang et al., "BreathTrack: Tracking Indoor Human Breath Status via Commodity WiFi", IEEE Internet of Things Journal, vol. 6, No. 2, Apr. 2019, pp. 3899-3911, doi: 10.1109/JIOT.2019.2893330.

Zhang et al., "Character-level Convolutional Networks for Text Classification", arXiv:1509.01626v3 [cs.LG], Apr. 4, 2016, Advances in Neural Information Processing Systems, 2015, pp. 649-657.

Zhang et al., "Vibrosight: Long-Range Vibrometry for Smart Environment Sensing", UIST '18: Proceedings of the 31st Annual ACM Symposium on User Interface Software and Technology, Oct. 14-17, 2018, pp. 225-236, doi: 10.1145/3242587.3242608.

(56) References Cited

OTHER PUBLICATIONS

Zheng et al., "V2iFi: in-Vehicle Vital Sign Monitoring via Compact RF Sensing", Proceedings of the ACM on Interactive, Mobile, Wearable and Ubiquitous Technologies, vol. 4, No. 2, Jun. 15, 2020, 27 pgs., doi: 10.1145/3397321.

"X4C007—Datasheet, Ultra Wideband (UWB) Impuse Radar Sensor", Novelda, Retrieved from: https://fcc.report/FCC-ID/2AD9Q-X4C007/4756670.pdf, 2020, 13 pgs.

Bennett, Rachel, "Introducing the Amazon Alexa Premium Far-Field Voice Development Kit", Amazon.com, Retrieved from: https://developer.amazon.com/en-US/blogs/alexa/post/80facfd2-1176-4c4f-94ac-4c5c781011ca/amazon-alexa-premium-far-field-voice-development-ki, Jan. 5, 2018, 2 pgs.

Klemm et al., "Clinical trials of a UWB imaging radar for breast cancer", Proceedings of the Fourth European Conference on Antennas and Propagation, Apr. 12-16, 2010, 4 pgs., doi: 10.14361/transcript.9783839415696.fm.

* cited by examiner

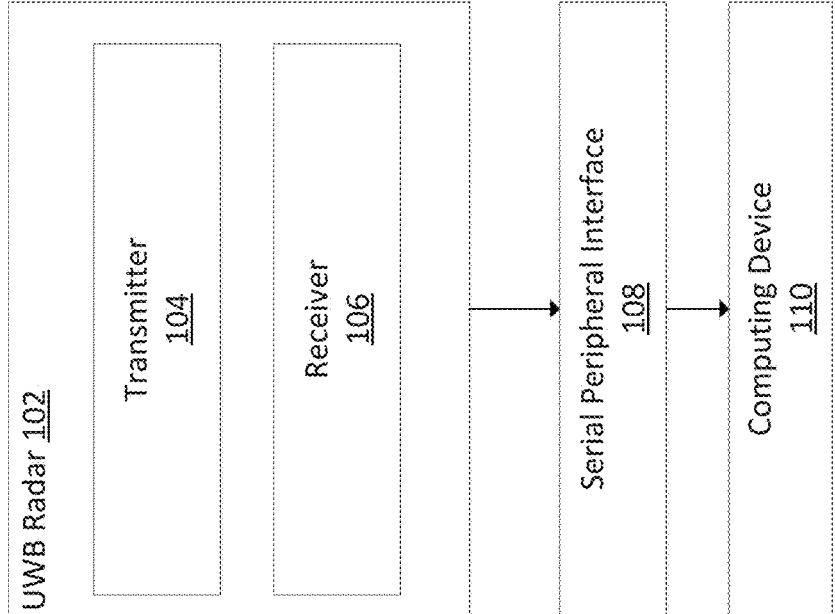
FIG. 1

300

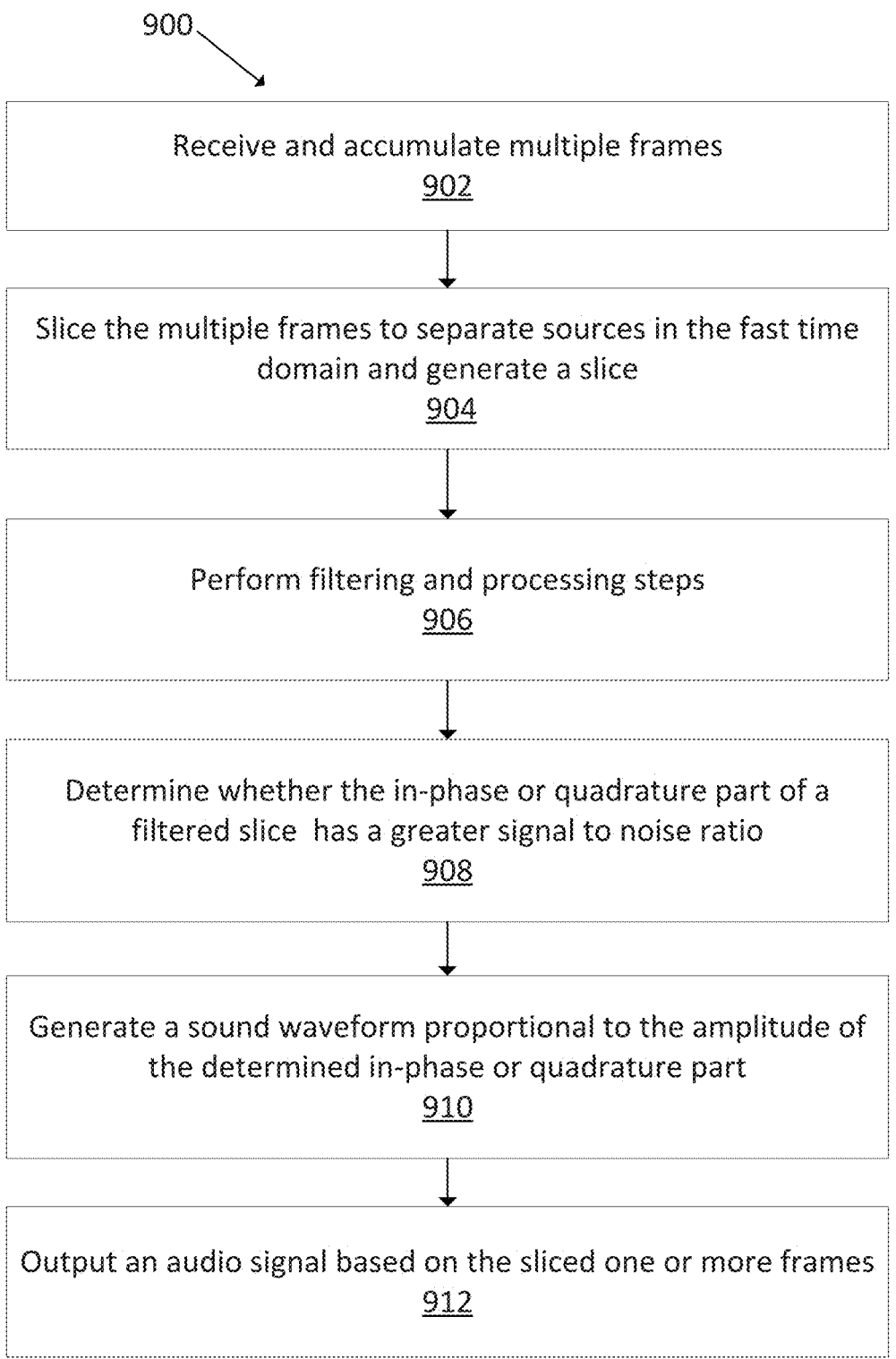

900

Receive and accumulate multiple frames
902

Slice the multiple frames to separate sources in the fast time domain and generate a slice
904

Perform filtering and processing steps
906

Determine whether the in-phase or quadrature part of a filtered slice has a greater signal to noise ratio
908

Generate a sound waveform proportional to the amplitude of the determined in-phase or quadrature part
910

Output an audio signal based on the sliced one or more frames
912

Receive a radar data including one or more frames
1002

Perform phase noise correction
1004

Perform static clutter suppression
1006

Perform vibrating activity localization
1008

Generate a slice based on vibration localization
1010

Perform denoising (spectral subtraction)
1012

Perform audio recovery
1014

SYSTEMS AND METHODS FOR USING ULTRAWIDEBAND AUDIO SENSING SYSTEMS

RELATED APPLICATIONS

The present application claims priority to U.S. Provisional Patent Application No. 63/264,079 entitled "UWHear: Through-wall Extraction and Separation of Audio Vibrations Using Wireless Signals" filed Nov. 15, 2021, the disclosure of which is hereby incorporated by reference in its entirety.

STATEMENT OF FEDERAL SUPPORT

This invention was made with government support under Grant Numbers 1705135 and 1329755, awarded by the National Science Foundation and under Grant Number W911NF-17-2-0196, awarded by the U.S. Army, Army Research Laboratory and under Grant Number HR0011-18-3-0004, awarded by the U.S. Department of Defense, Defense Advanced Research Projects Agency. The government has certain rights in the invention.

FIELD OF THE INVENTION

This invention relates to RF sensing. More particularly it relates to wireless vibrometry for audio sensing.

BACKGROUND

Computational analysis of sound events and scenes has emerged as an important element of many sensing applications. Robust sound event detection and classification (SEDC) can require accurate recognition and estimation of the onset and the endpoints of individual sound events in an audio signal. SEDC can be critical to exploiting acoustic modality for providing enhanced context-awareness in physical spaces (e.g., monitoring acoustic events in smart home and buildings), urban city acoustic surveillance and noise source identification, as well as audio-based activity recognition to provide care for elderly or disabled. While effective analysis of acoustic scenes and events depend on a confluence of many different technologies, a particularly important role is played by the transducer hardware used to capture the acoustic energy and transform it into an electronic signal. Conventionally the transducer of choice is a microphone that converts mechanical sound pressure waves into electrical signals making use of electromagnetic, electromechanical, or capacitive phenomena.

As these microphones capture the overall sound pressure wave at their location, their output is a blend of the sounds arriving simultaneously from spatially separated sources in the environment, making it hard for the SEDC system to isolate any individual sound event. For example, if a vacuum cleaner and a blender are running simultaneously at different locations in a room, a microphone will output a signal that corresponds to a mixture of the two sounds in both time and frequency domains. More generally, besides the sound from the source of interest, a microphone captures all sorts of sounds present in the environment, including both background noises (e.g., traffic, airplane engine) and sounds from other independent sources of interest. This mixing of various sounds presents a dual challenge for the downstream sensor information processing tasks. Microphone-based works have been proposed using complicated infrastructure to solve the sound separation problem, such as a large-scale or scattered microphone array. Yet, very often the background noise cannot be entirely eliminated.

SUMMARY OF THE INVENTION

A device can be configured for generating an audio signal based on audio source ranging using ultrawideband signals. In an embodiment the device includes, a transmitter circuitry, a receiver circuitry, memory and a processor. The processor configured to generate a radio signal. The radio signal including an ultra-wideband Gaussian pulse modulated on a radio-frequency carrier. The processor further configured to transmit the radio signal using the transmitter circuitry, receive one or more backscattered signals at the receiver circuitry, demodulate the one or more backscattered signals to generate one or more baseband signals, and generate a set of data frames based on the one or more baseband signals. A data frame of the set of data frames is a time series generated based on backscattered signal data collected during a time interval, wherein the time interval is defined as a period from a transmission of the radio signal to a receipt of a last backscattered signal. The processor further configured to determine one or more distance bins associated with the one or more backscattered signals based on the set of data frames, generate a slice based on a selected distance bin. The selected distance bin selected from among the determined one or more distance bins, wherein the slice includes a selected portion of the data from the set of frames. The portion of the data selected corresponds to the selected distance bin and the data defining a slice waveform. The processor further configured to generate a sound waveform based on the generated slice.

In another embodiment, generating one or more baseband signals includes generating an in-phase component and a quadrature component.

In yet another embodiment, generating one or more baseband signals includes generating an in-phase component and a quadrature component, and the set of frames is generated based on a highest spectrum concentration component, the component selected from a list of the in-phase component and the quadrature component.

In still another embodiment, the generated sound waveform is proportional to an amplitude of the slice waveform associated with the generated slice.

In another embodiment again, determining one or more distances associated with the one or more backscattered signals based on the set of frames includes determining a time of flight for each of the one or more backscattered signals.

In another further embodiment, the received one or more backscattered signals are demodulated to generate a baseband signal.

In another additional embodiment, the sinusoidal pulse is a gaussian pulse.

In yet still another embodiment, the radio signal is an ultrawideband signal.

In yet another embodiment again, the radio signal is an impulse radio ultrawideband signal.

In yet another additional embodiment, the transmitter circuitry is configured to transmit signals using an impulse radio ultra-wideband.

In yet another further embodiment, the transmitter circuitry is configured to transmit a discontinuous wireless pulse signal.

In yet still another embodiment again, the transmitter circuitry is configured to use a sub 10 GHz range.

In yet still another further embodiment, the set of frames is a two-dimensional data structure.

In yet still another additional embodiment, the slice is a one-dimensional data structure.

In yet still another further embodiment again, generating a sound waveform based on the slice includes generating a waveform proportional to an amplitude, the amplitude based a waveform described by data included in the slice.

In a further embodiment, generating a sound waveform based on the slice includes generating a waveform proportional an amplitude of an in-phase part, the amplitude based on the slice.

In a yet further embodiment, generating a sound waveform based on the slice includes generating a waveform proportional to an amplitude of a quadrature part, the amplitude based on the slice.

In an additional further embodiment, generating a sound waveform based on the slice includes generating a waveform proportional to an amplitude, the amplitude generated based on filtering the slice.

In an additional further embodiment again, the processor is further configured to perform a phase noise correction on the set of data frames. Performing the phase noise correction includes generating a reference slice based on the set of data frames. The reference slice corresponding to a first distance bin. The first distance bin is a closest distance bin to the transmitter circuitry. The processor further configured to determine a standard reference phase based on the reference slice. The processor further configured to, for each data frame of the set of data frames, determine a phase difference between a data frame first distance bin and the determined standard reference phase; and offset a phase error for all samples in the data frame based on the determined phase difference.

In a yet still further embodiment, calculating a standard reference phase based on the reference slice includes calculating a mean phase of the reference slice.

In a yet further embodiment again, offsetting the phase error for all samples in the data frame includes multiplying all samples in the data frame by Euler's number to the power of an indexed constant multiplied by the determined phase difference.

In a yet additional further embodiment, the processor is further configured to perform a static clutter suppression on the set of data frames. Performing the static clutter suppression includes applying a Butterworth finite impulse response filter (FIR) on each distance bin. Each distance bin corresponding to a distance bin portion of data from the set of data frames.

In a yet still further embodiment again, the FIR is applied with a stopping frequency at 20 Hz.

In an additional yet still further embodiment again, the FIR is applied with a passing frequency at 70 Hz.

In an additional embodiment, the FIR is applied using a stop-band attenuation set at −80 dB.

In another additional embodiment, performing static clutter suppression further includes applying a high-pass filter.

In a yet additional embodiment, the processor is further configured to perform a vibrating activity localization on the set of data frames. Performing the vibrating activity localization includes performing a discrete Fourier transform over each distance bin to generate a spectrum for each distance bin. Each distance bin corresponding to a distance bin portion of data from the set of data frames. The vibrating activity localization further including generating a Herfindahl-Hirschman index for each distance bin based on the generated spectrums, and selecting those distance bins which correspond to Herfindahl-Hirschman indices exceeding a threshold value.

In a still yet additional embodiment, the processor is further configured to perform a denoising on the generated slice. The denoising includes applying spectral subtraction on the generated slice, and applying a normalization on an output of the spectral subtraction.

In a yet additional embodiment again, the applied spectral subtraction is an algorithm selected from the list of linear spectral subtraction, non-linear spectral subtraction, and multi-band spectral subtraction.

In a further additional embodiment again, the processor is further configured to perform audio recovery on the generated slice. The audio recovery includes outputting an audio file based on the generated slice.

In a still yet another further additional embodiment, each frame of the set of frames is associated with the transmission of an RF probe pulse.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

FIG. 1 conceptually illustrates an example IR-UWB system in accordance with an embodiment of the invention.

FIG. 9 conceptually illustrates an example process for generating audio data separated based on sound source in accordance with an embodiment of the invention.

DETAILED DESCRIPTION

Figure 2:
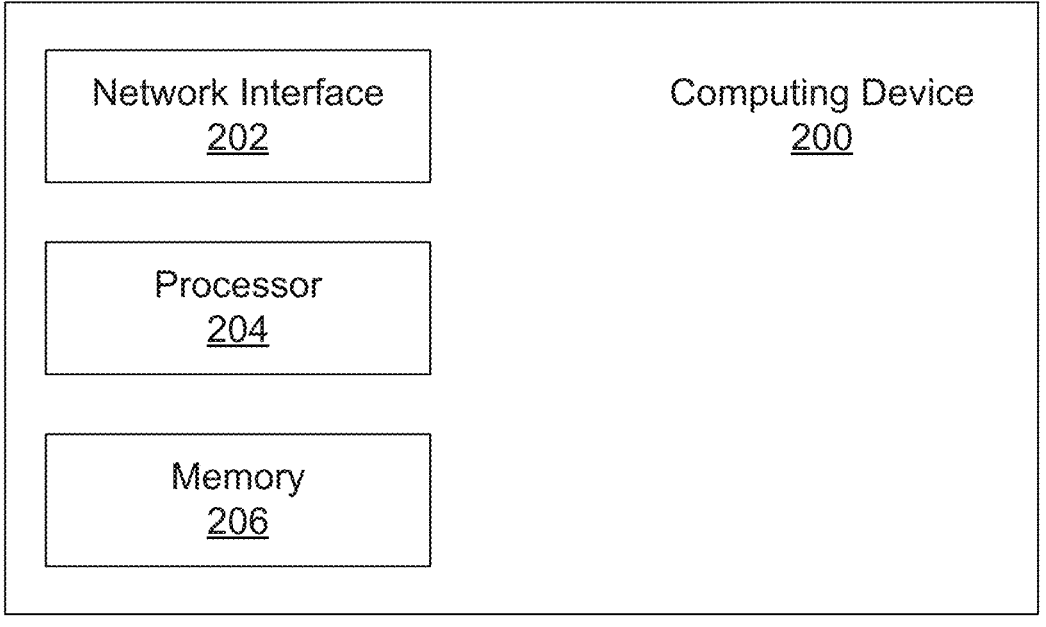
FIG. 2 conceptually illustrates an example computing device in accordance with an embodiment of the invention.

In some embodiments of the invention, an ability to detect, classify, and locate complex acoustic events can be a powerful tool to help smart systems build context-awareness (e.g., to make rich inferences about human behaviors in physical spaces). Conventional methods to measure acoustic signals can employ microphones as sensors. As signals from multiple acoustic sources are blended during propagation to a sensor, methods using microphones can impose a dual challenge of separating the signal for an acoustic event from background noise and from other acoustic events of interest. Certain embodiments of the invention can overcome these challenges by utilizing radio-frequency (RF) signals, e.g. (Wi-Fi or millimeter-wave (mmWave), to sense sound directly from source vibrations.

In accordance with several embodiments of the invention, systems can simultaneously recover and separate sounds from multiple sources. Systems can, in some embodiments, employ Impulse Radio Ultra-Wideband (IR-UWB) technology to construct enhanced audio sensing systems. In various embodiments, IR-UWB radios can penetrate building materials, which can enable IR-UWB systems to operate in non-line-of-sight (NLOS) conditions. Audio can be recovered, in many embodiments, using RF pulses. In some embodiments, content from two sound sources placed around 25 cm (or another distance) or more apart can be separated. In certain embodiments, IR-UWB systems can capture and separate multiple sounds and vibrations while being immune to non-target noise coming from other directions.

IR-UWB systems can be fine-grained audio sensing systems that are, in several embodiments, capable of identifying multiple sound sources simultaneously, resilient to background noise, and/or robust in non-line-of-sight (NLOS) scenarios. Impulse Radio Ultra-Wideband (IR-UWB) radar can be used to enhance the process of sound recovery in challenging environments. In several embodiments, IR-UWB radars can send very short pulses in the time domain while occupying a wide frequency bandwidth. Wide frequency bandwidths can provide fine ranging resolution. In accordance with many embodiments of the invention, for every transmitted probe pulse (e.g., RF probing signal), an IR-UWB receiver can collect a number of reflected pulses (e.g., backscattered pulses). Sound sources can thereby be well separated by accurately estimating the Time-of-Flight (ToF) of the reflected pulses. In several embodiments, this procedure can be repeated rapidly with constant intervals to produce two-dimensional data (e.g., multiple time series retrieved from different distance ranges). In certain embodiments, operating in a sub-10 GHz band can allow IR-UWB systems to penetrate light building materials.

In accordance with various embodiments of the invention IR-UWB systems can have limited transmission power, which can ensure co-existence with other communication schemes in the same frequency band (e.g., such as WiFi and Bluetooth). In many embodiments, IR-UWB can have a peak pulse output power less than 6 dBm (or another value).

In several embodiments, IR-UWB systems can be capable of (i) through-wall sensing of audio vibrations, (ii) recovering and separating the sounds from two sources placed as close as 25 cm in distance (or another distance) without any cross-interference, and/or (iii) retrieving the sound from one or more sound sources (e.g., real-world household tools such as a vacuum cleaner and a hand drill).

Audio Sensing Via IR-UWB

Turning now to the drawings, systems and methods for implementing IR-UWB systems for audio sensing in accordance with various embodiments of the invention are illustrated.

Wireless vibrometry can refer to techniques of sensing vibration-related information using wireless signals. Mechanical vibrations whose frequencies lie in the auditory range can create audible sounds. In several embodiments, wireless vibrometry can allow the active discovery of sound activities from the vibrations at sound sources.

IR-UWB Systems

In several embodiments, an IR-UWB system can include a UWB radio (e.g., radar). UWB radios can have operating frequencies occupying a bandwidth more than 500 MHz. An example IR-UWB system is conceptually illustrated in FIG. 1. In various embodiments the system is configured to generate an audio signal by transmitting an ultrawideband pulse and receiving waveforms resulting from reflections of the pulse at sound generating sources. The IR-UWB system 100 can include a UWB radar 102. The UWB radar 102 can include a transmitter 104 and a receiver 106. The UWB radar 102 can be in communication, via a serial peripheral interface 108, with a computing device 110.

While specific processes and/or systems for an IR-UWB system, any of a variety of processes and/or systems can be utilized for an IR-UWB system as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to an IR-UWB system, the techniques disclosed herein may be used in any type of signal processing and/or data generating system. The techniques disclosed herein may be used within any of the UWB, radar, UWB audio systems, and/or signal processing systems as described herein.

In accordance with various embodiments of the invention, a computing device can receive information from a UWB radar. An example computing device is conceptually illustrated in FIG. 2. A computing device 200 can include a network interface 202, a processor 204, and a memory 206. The memory 206 can contain instructions to cause the processor 204 to execute processes and instructions as described elsewhere herein.

While specific processes and/or systems for a computing device are described above, any of a variety of processes and/or systems can be utilized for a computing device as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to a computing device, the techniques disclosed herein may be used in any type of signal processing and/or data generating system. The techniques disclosed herein may be used within any of the UWB, radar, UWB audio systems, and/or signal processing systems as described herein.

IR-UWB radars can operate by sending (e.g., transmitting) pulses into an environment and collecting (e.g., receiving) responses. The received response can be reflected pulses (e.g., backscattered pulses). In several embodiments, super-short pulse durations of IR-UWB can enable using time-of-flight (ToF) for ranging tasks. In certain embodiments, sound source separation can be achieved based on ToF ranging tasks. IR-UWB radar can generate data, that data can be used to generate a two-dimensional (2D) matrix. The 2D matrix and its generation are discussed in greater detail below.

Figure 3:
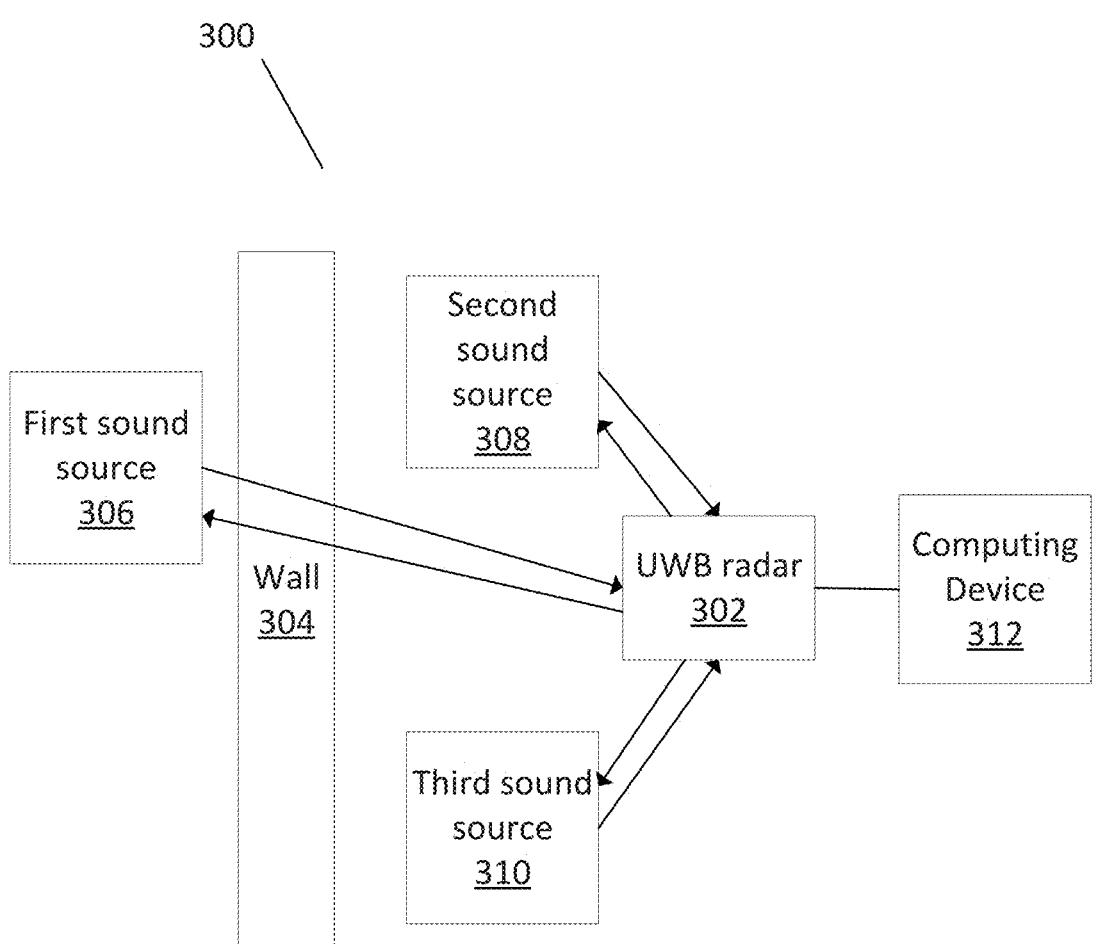
FIG. 3 conceptually illustrates an example IR-UWB audio sensing system in accordance with an embodiment of the invention.

In various embodiments, a UWB radar can transmit pulses and receive reflections from various objects (e.g., sound sources). UWB radars can transmit information about received reflections to computing devices. An example IR-UWB audio sensing system is conceptually illustrated in FIG. 3. The system 300 can include a UWB Radar 302. UWB radars can transmit pulses, the pulses can be reflected by sound sources. In the depicted example, the UWB radar 302 can transmit a pulse capable of penetrating a wall 304. The transmitted pulse can be reflected by each of the first sound source 306, the second sound source 308, and the third sound source 310. The first sound source 306 can be located on a side of the wall 304 that is opposite the UWB radar 302 such that transmitted and reflected pulses traverse the wall 304. The UWB radar 302 can be in communication with a computing device 312. In accordance with several embodiments of the invention, UWB radars can send and/or receive instructions and/or information to and/or from computing devices.

While specific processes and/or systems for an IR-UWB audio sensing system are described above, any of a variety of processes and/or systems can be utilized for IR-UWB audio sensing system as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to an IR-UWB audio sensing system, the techniques disclosed herein may be used in any type of signal processing and/or data generating system. The techniques disclosed herein may be used within any of the UWB, radar, UWB audio systems, and/or signal processing systems as described herein.

Figure 4:
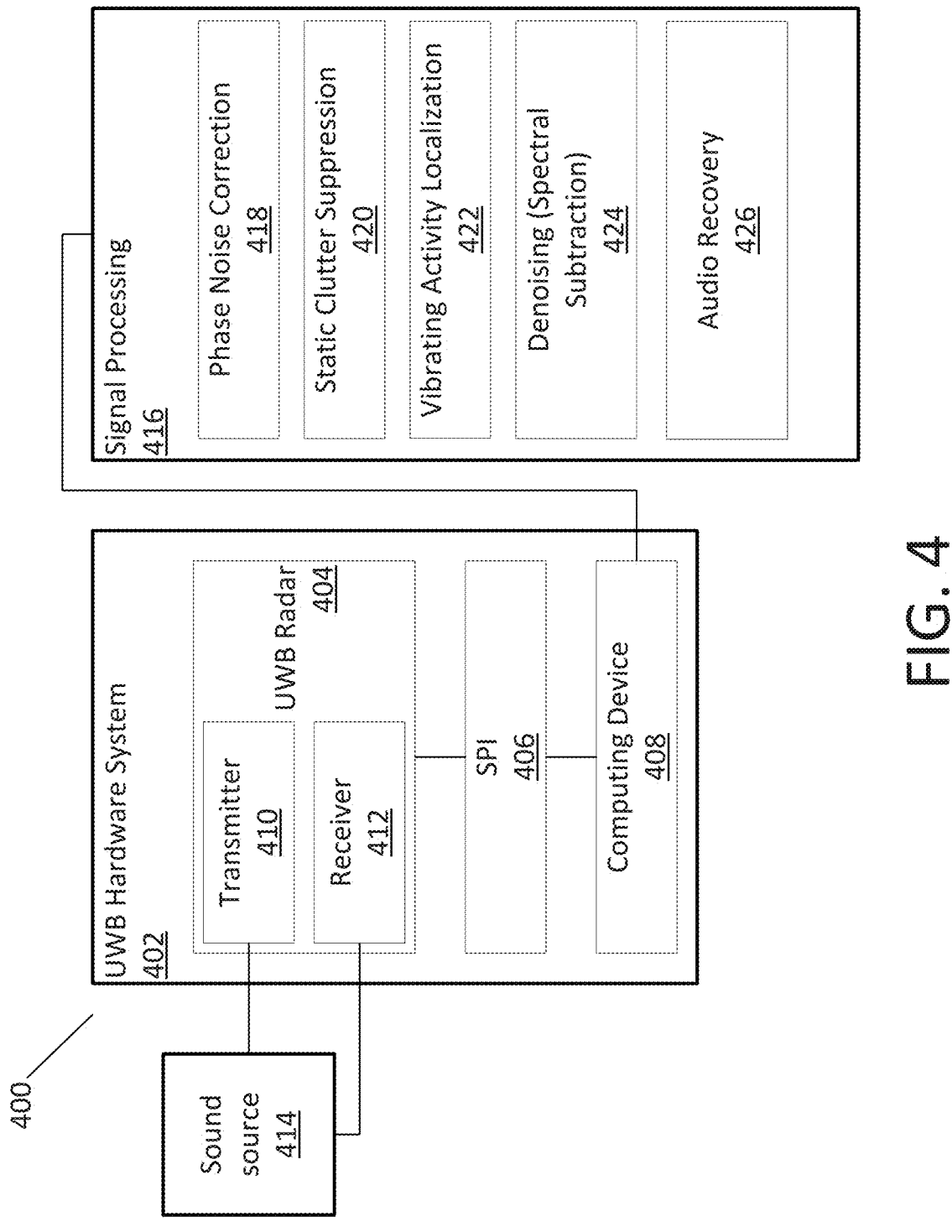
FIG. 4 conceptually illustrates an example of UWB hardware and associated signal processing in accordance with an embodiment of the invention.

In several embodiments, UWB hardware can transmit pulses and/or receive reflections to and/or from objects. UWB hardware can, in accordance with various embodiments of the invention, communicate data based on transmitted pulses and received reflections to computing devices. Computing devices can process the data to generate recovered audio. An example of UWB hardware and associated signal processing is conceptually illustrated in FIG. 4. An IR-UWB audio sensing system 400 can include a UWB hardware system 402. The hardware system 400 can include a UWB radar 404. The UWB radar 404 can be connected, via a communication channel 406 (e.g., a Serial Peripheral Interface Bus (SPI) or other communication interface), to a computing device 408. The UWB radar 404 can include a transmitter 410 and a receiver 412. UWB radar transmitters can be configured to transmit UWB pulses. UWB radar receivers can be configured to receive reflected UWB pulses (e.g., backscattered pulses). In the depicted example the UWB radar 404 can transmit a UWB pulse. The pulse can be scattered and/or reflected by a sound source 414. The reflected pulse (e.g., backscattered pulses) can be received by the receiver 412. The UWB radar 404 can transmit data via the communication channel 406 to the computing device 408, and the data can be based on the transmitted pulse and/or received reflected pulse (e.g., backscattered pulses).

Based on received data, the computing device 408 can conduct signal processing 416. Signal processing 416 can include various processes such as phase noise correction 418, static clutter suppression 420, vibrating activity localization 422, denoising (e.g., spectral subtraction) 424 and/or audio recovery 426, as will be discussed in greater detail further below.

In various embodiments, IR-UWB audio systems can use IR-UWB radars that send out pulses (e.g., at a constant rate), collect reflected pulses (e.g., backscattered pulses), and down-convert the radio frequency data to baseband I/O data. The I/O data can, in several embodiments, then be analyzed with a signal processing pipeline. Signal processing pipelines can include several signal processing modules. Processes can, in accordance with embodiments of the invention employ a phase noise correction algorithm to correct for phase variations caused by sampling clock jitters. Static clutter suppression processes can remove reflections caused by static objects (e.g., walls, furniture, and/or other no sound sources). As described elsewhere herein sound-related information can appear on the amplitude of the real or imaginary part of I/O data. In various embodiments, processes can juxtapose in-phase parts and quadrature parts of signals. Processes can, in many embodiments, use vibration target localization techniques to locate distance bins where vibrations happen. In various embodiments, processes can obtain recovered sound by performing further denoising. Further denoising can include performance of spectral subtraction algorithms. In several embodiment, recovered sound can be further processed (e.g., sound classification, speech recognition, and/or other processes can be performed).

In some embodiments, the UWB system can be implemented with a radar (e.g., Novelda Xethru X4M05 IR-UWB radar board) combined with a computing device (e.g., Raspberry Pi 3B+). The connection between the computing device and the radar can, in certain embodiments, be realized via an SPI interface. The radar can include an X4A02 Antenna board and a Novelda X4 impulse radar transceiver System on Chip (SoC). In various embodiments, the radar can operate at a center frequency of 7.29 GHz with a bandwidth of 1.4 GHz.

In various embodiments, transmitted pulses can be Gaussian pulses. Transmitted pulses can be modulated on a sub-10 GHz carrier frequency. At the receiver side, a digital down-conversion can be performed on received Radar Frame (RF) data. In various embodiments, digital down-conversion is performed inside a system on a chip (e.g., on a X4 SoC) to retrieve baseband pulses. Each retrieved baseband pulse can be a complex double representing in-phase and quadrature (I/O) baseband data. In several embodiments, digital down-conversion can decimate (e.g., reduce the sampling frequency) the RF data by a factor of 8. In several embodiments, distances between adjacent distance bins in the baseband data can be calculated as baseband_interval= [lightspeed*8/(2*sampling rate)]. In some embodiments, the baseband interval can be calculated as baseband_interval= $[(2.998*10^8*8)/(2*23.328*10^9 \text{ Hz})]=0.0514$ m, where 23.328 Giga-Samples/s is the rate with which the RF data are sampled. Since the maximum length of the received Radar Frame (RF) data before the down-conversion has 1536 bins, in various embodiments the maximum range of such a radar system can be expressed as max_dist=1536/ 8*0.0514 m=9.874 m. In accordance with several embodiment of the invention, collected data can be complex matrix with dimensions of fast time by slow time. The fast time dimension can indicate the target distance. The slow time dimension can indicate an elapsed time.

In several embodiments, a Xethru radar driver is implemented with modifications to enable faster data transfer and to strike a balance between sampling rate and signal-to-noise-ratio (SNR). In various embodiments, a radar (e.g., a X4 radar SoC) receives and sends data to a computing device (e.g., a Raspberry Pi) using Serial Peripheral Interface Bus (SPI). Once the radar SoC finishes a data frame, it can raise an SPI interrupt so that the controller (e.g., Raspberry Pi) can read the data. In several embodiments, a radar SoC can only cache the last frame it received and therefore the clock of a SPI can be set higher to ensure that the data can be transported in time. In several embodiments the SPI clock can be set to 32 MHz, which may correspond to the highest sampling rate that the computing device permits (e.g., the highest sampling rate the GPIO Interface library for the Raspberry Pi allows).

In accordance with embodiments of the invention, the radar transceiver can operate at various transmitting power settings. Transmitting power setting can be set to low (e.g., 0.48 pJ/pulse), medium (e.g., 1.47 pJ/pulse), and/or high (e.g., 2.65 pJ/pulse). Higher power level can increase the sensitivity and effective range of the system.

In various embodiments a maximum range of an IR-UWB audio system can be around 9.87 m. Minimum and maximum detection distances can be subject to change via driver settings to focus on a specific range. For example, a minimum distance (e.g., 0.3 m) can be set so that the first few bins are discarded. In various embodiments the minimum distance is set to discard bins that are overfilled by crosstalk between the transmitting and receiving antennas.

In several embodiments, a swept-threshold sampling method can be implemented to gather data because the pulse duration is short. Received signal frames can be compared against a threshold to generate one-bit values for all data points in this frame. The threshold will increase by one step before the response of the next repeated pulse comes. Due to the extremely high pulse repetition rate, the vibrating target can be approximated as static in such a short period, which means that the repeated frames can be treated the same as the previous ones. The process can continue such that after a certain number of frames, a multiple-bit digital representation of the original analog frame can be generated. This procedure can be denoted as one iteration. In several embodiments, multiple iterations can be averaged during one step (increase pulse-per-step) to improve SNR. Still, in various embodiments, the relationship of frames per second (FPS) to various input values can be mathematically described as FPS=[(Pulse_Repetition_Frequency*Duty_Cycle)/(Iterations*Pulse_Per_Step*(DAC_max−DAC_min+1)].

In several embodiments, the Pulse Repetition Frequency can be set to be 15.1875 MHz, DAC_max=1100, and DAC_min=949, Iterations=20, PulsePerStep=2, and FPS=1.5 kHz. In accordance with many embodiments of the invention, due to the limitations of SPI transfer speed, the sampling rate can be limited to 1.6 kHz; otherwise a packet loss can be inevitable.

The data can be cached locally in a computing device (e.g., a Raspberry Pi) and then transferred and/or streamed to another computing device (e.g., computer, a computer with AMD Ryzen 7 2700X processor for processing).

In several embodiments collected data are analyzed with signal processing algorithms. Signal processing algorithms can include phase noise correction that removes sampling clock jitters, static clutter suppression that suppresses the reflections caused by static objects, and/or vibration activity localization that determines the distances of the vibrating targets. Audio can be recovered, in many embodiments, after denoising and normalizing. Each of these modules is discussed in further detail elsewhere herein.

In accordance with numerous embodiments of the invention, measurements of amplitude change over time of the in-phase or quadrature data caused by source vibrations can be used to generate sound information (e.g., audio). However, many factors can impede retrieving the information related to sound vibration, one such factor is the phase noise. In many embodiments, phase noise can be introduced due to imperfections of signal sampling clocks. Imperfections can include crystal defects and phase lock loop (PLL) error. Phase noise can cause a process to observe a rapid change of phase back and forth, which will then lead to the system mistakenly identify a vibration in bins and/or can cause distortion in recovered sound. Processes, in accordance with embodiments of the invention can perform phase noise correction. For each frame (e.g., frames as described elsewhere herein), the first distance bin contains mostly signal leakage, (e.g., direct signal leakage from the transmitter to the receiver). In several embodiments, processes can calculate the mean phase of a first bin and use it as a reference phase. The mean phase of the first bin can refer to the mean phase of a set of first bins, each of the first bins corresponding to a frame from a set of frames. In numerous embodiments, a phase correction can be performed by multiplying all samples from a current frame with a correction term so that the phase of the current frame's first distance bin becomes the same as the reference phase.

While vibrations can create a unique pattern on the receiving data, static objects like walls and furniture can also reflect UWB pulses and can create strong responses. This can be described as static clutters. Static responses can be so strong that the useful signal is buried underneath. However, in various embodiments, the static clutter can be assumed as usually time-invariant in a select distance bin. Processes can apply a Butterworth finite impulse response filter (FIR) on each distance bin. In some embodiments a stopping frequency at 20 Hz and a passing frequency at 70 Hz can be used. In accordance with embodiments of the invention, to ensure zero phase distortion at the beginning of the sequences, FIR filtering can be applied to input frame data in both the forward and reverse directions. In several embodiments stop-band attenuation is set at −80 dB.

In several embodiments, a static clutter suppression filter can filter out the low-frequency responses caused by human activities and/or chest motion related to breathing. In addition, due to the low-pass nature of UWB audio sensing (discussed elsewhere herein) pre-emphasis can be performed along with static clutter suppression. Pre-emphasis can be performed according to:

y(t)=x (t)−αx(t−1), where α (0.95, 1). This difference equation can work as a high-pass filter to compensate for the signal loss in high-frequency ranges.

Vibrating target localization can be performed in various embodiments. UWB data can contain multiple time series (e.g., columns, slices) corresponding to multiple distance bins. Sound sources can be identified based on selection of candidate bins with a high signal-to-noise-ratio (SNR). In several embodiments, signals can be noisy in some channels, and only performing thresholding and/or calculating variance in the time domain may not give satisfactory results for localizing a sound source. In several embodiments, a solution to this problem can use data from a frequency domain.

Compared with noise, a channel (a certain distance bin across multiple frames) with sound vibration information has a more concentrated spectrum than a noisy channel. For example, music will have basic notes and their higher-order harmonics. Also, while human voice power is more widely distributed in the spectrum than music, we can still observe basic frequencies F0 and their harmonics. In accordance with various embodiments of the invention, a process can perform a discrete Fourier transform (DFT) over all channels to get their spectrums. Based on the spectrums, a Herfindahl-Hirschman index (HHI) can be used to calculate concentration levels associated with the channel spectrums. The Herfindahl-Hirschman index can be calculated by squaring the "market share" of each frequency and summing the resulting numbers. Here, the "market share" can be defined as the power of the current frequency divided by the overall power of the signal time series. The distance bins, in some embodiments, with the highest HHIs are selected as the candidates of bins containing vibration information. For slow moving objects, like vacuum robots, the target is slowly moving between distance bins. In some embodiments, vibrating target localization can be performed in short slow-time windows of around 1 second. The time series can then be combined to generate a final output.

Denoising and normalization can be performed by a process. Based on a located vibrating target, in accordance with several embodiments of the invention, an audio signal estimation can be acquired by slicing (e.g., as described elsewhere herein) a distance bin from the data. The recovered sound can, in some embodiments, still contain non-negligible background noise. This noise can be very similar to an additive white gaussian noise (AWGN). In various embodiments, background noise can be reduced by applying a spectral subtraction (SS) process.

In several embodiments, the SS process can receive an input noisy signal including a signal part and a noise part. The noisy signal can be divided into overlapping frames. The spectral subtraction process can perform a fast Fourier transform to estimate the spectrum of noise. The spectrum of noise can be estimated and updated continuously using pure noise. The spectral subtraction process can continue by subtracting the noise spectrum amplitude from the noisy signal to obtain a spectrogram amplitude. In some embodiments, the spectrogram amplitude can be multiplied with an original phase to get an estimation of the signal (e.g., a denoised signal).

In several embodiments, different variants of SS methods can be implemented such as linear SS, non-linear SS, and/or multi-band SS. In accordance with embodiments of the invention, the output (e.g., the denoised signal) of an SS process can be normalized and output as an audio file (e.g., .wav file) to generate recovered sound. In several embodiments, a Short Time Fourier Transform (STFT) can be performed to enable displaying a visualization of the recovered sound. A displayed output of STFT, in many embodiments, can include a first axis for time and a second axis for frequency.

In some embodiments, an interference signal (e.g., an interference signal of 60 Hz and its multiples) can be detected. The interference signal can be filtered using an infinite impulse response (IIR) comb filter. In several embodiments an IIR comb filter can be applied to filter out power frequency signal components.

In several embodiments, vibrations can be recovered by analyzing a series of frames. Frame data can be generated based on the granularity of slow time (e.g., the frame rate). In some embodiments, a frame rate can be limited to 1.6 kHz. In some embodiments, data transmission speed can be limited by an SPI interface. In some embodiments, a Quad Serial Peripheral Interface (QSPI), and/or an FPGA can used to increase the frame rate to 3 kHz or more.

In various embodiments a controllable low-noise amplifier and/or a power amplifier can be included in the UWB audio system between a SoC (e.g., an X04 SoC) and the antenna.

In various embodiments, a UWB audio system can include a directional antenna whose field of view (FOV) is about 50 degrees in azimuth and elevation. In accordance with embodiments of the invention, multiple IR-UWB radar instances can be combined. The multiple IR-UWB instances can be combined into a single board in some embodiments. The multiple IR-UWB instances can face various directions and their data can be combined to cover all directions. In some additional embodiments, multiple instances of IR-UWB radars can be used with omnidirectional antennas to perform trilateration.

In accordance with various embodiments of the invention, a comprehensive wireless vibrometry system can combine modalities such as mmWave, IR-UWB, lasers and/or other modalities. Operating at different frequency ranges, these technologies can compensate for each other and make a more robust audio sensing system. In several embodiments IR-UWB audio sensors can be implemented with traditional microphones to provide additional spatial information. In several embodiments, using short-duration pulses and ToF to collect vibrations with spatial information can be implemented with a variety of wireless sensing technologies.

While specific processes and/or systems for UWB hardware and associated signal processing, any of a variety of processes and/or systems can be utilized for UWB hardware and associated signal processing as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to UWB hardware and associated signal processing, the techniques disclosed herein may be used in any type of signal processing and/or data generating system. The techniques disclosed herein may be used within any of the UWB, radar, UWB audio systems, and/or signal processing systems as described herein.

Figure 5:
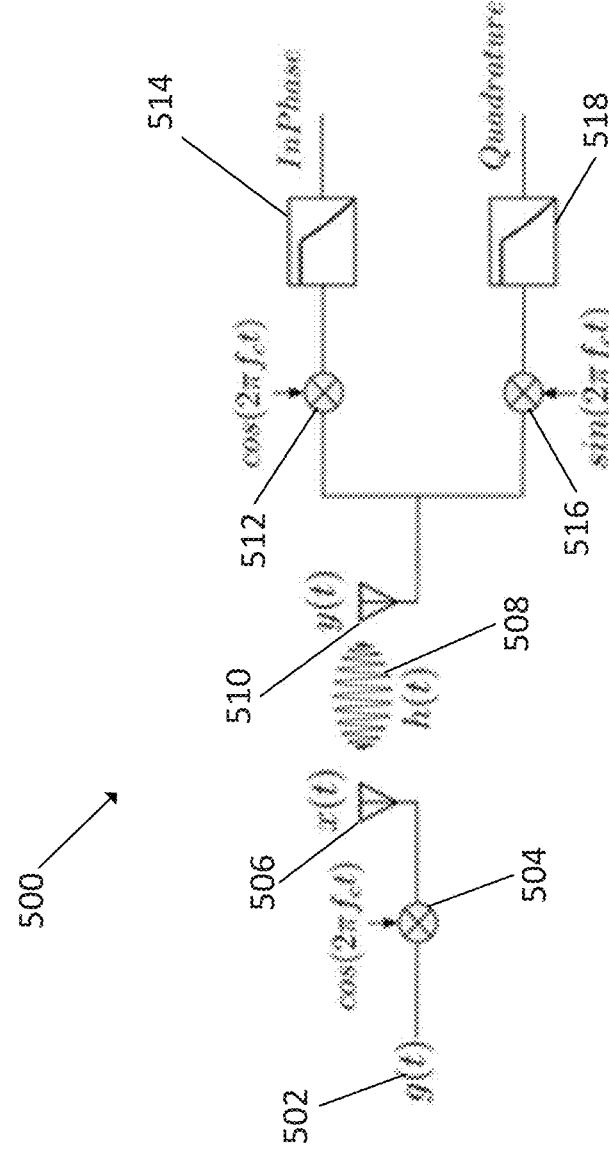
FIG. 5 conceptually illustrates an example baseband equivalent representation of an IR-UWB audio system in accordance with an embodiment of the invention.

In accordance with several embodiments of the invention, IR-UWB audio systems can be represented by a baseband equivalent representation. An example baseband equivalent representation of an IR-UWB audio system is conceptually illustrated in FIG. 5. In several embodiments, baseband equivalent representations of IR-UWB systems can include references to time t. Time t within a frame can correspond to the time of flight (ToF) of a signal pulse. Time t can also be known as fast time. In certain embodiments, IR-UWB audio systems can sequentially transmit probe pulses (e.g., RF probing signals) with interval Ts, which can be treated as a sampling rate on a slow time (tslow) axis. In some embodiments, fast time can be fine-grained relative to slow time (e.g., fast time can be on the order of around tens of picoseconds). In various embodiments, slow time can be course-grained relative to fast time (e.g., slow time can be on the order of around hundreds of microseconds). Returning to FIG. 5, the baseband equivalent representation 500 can include gaussian pulses 502 as represented by g(t). The gaussian pulses 502 can be modulated on a carrier frequency 504. A transmitting antenna 506 can transmit a pulse sequence 508. The pulse sequence 508 can interact with objects in the environment and can be received by a receiving antenna 510. The received signal (e.g., received pulse sequence) can be down converted. The received signal can be passed through a first mixer 512 to obtain an In-phase component 514. The received signal can be passed through a second mixer 516 to obtain a quadrature component 518.

In several embodiments, IR-UWB radars can transmit Gaussian pulses (e.g., g(t)) modulated on a carrier frequency (e.g., fc). Modulated pulses can be sent out to interact with the objects in the environment and reflections of the pulses can be received by the receiving antenna. In many embodiments, the transmitting antenna and the receiving antenna are co-located (e.g., nearly co-located, located on a common substrate, located on a single chip). The channel frequency response, in accordance with embodiments of the invention, can be characterized as a summation of P paths with different time delays and attenuations.

Although a number of UWB audio systems and associated hardware are described above with respect to certain embodiments of the invention, one skilled in the art will recognize that any of a variety of systems and components may be utilized in accordance with embodiments of the invention as appropriate to a particular application.

Sound Recovery Using UWB Pulses from an IR-UWB System

In accordance with embodiments of the invention, round-trip ToF can be determined for one or more sound sources. In several embodiments, a sound source distance can include a time-varying delay caused by minute target movement, such as the cone being pushed back and forth by the coil in any speaker. For static objects the time-varying delay can be zero (e.g., no vibration). IR-UWB audio sensing systems can be configured to recover the time-varying delay of sound sources to recover sound information.

In accordance with embodiments of the invention the movements of sound sources, if any, are ignored when recovering the audio signals because the movements are very slow relative to the pulse rate (slow time scale) and speed of light (fast time scale).

The received signal y(t) can be modeled as a convolution of a transmitted signal and a channel impulse response, plus additive noise. On the receiver side, in various embodiments, the received signal y(t) is down-converted. Then, y(t) can be multiplied with the carrier frequency in a mixer, and passed through a low-pass filter. This can result in an in-phase branch and a quadrature branch.

In various embodiments, a sound source ToF can be translated into target distances when multiplied with the speed of light. In several embodiments, different targets can have different target distances, and based on these different target distances, any sound source can be selected based on the target distance to perform sound source separation. Objects without audio-related movement can have no change over slow time. Objects without audio-related movement can have only static responses. Static responses, in accordance with embodiments of the invention, can be filtered out by applying static clutter suppression algorithms as described elsewhere herein.

In accordance with embodiments of the invention an amount of target micro displacement (e.g., vibration associated with sound) can be linearly proportional to an amplitude of a quadrature or in-phase part of a received signal. In various embodiments a process can generate audio based on the amplitude of a quadrature or in-phase part of a received signal. The received signal can be a reflected pulse (e.g., backscattered pulse). The reflected pulse can be a reflected pulse wherein the pulse was transmitted by an IR-UWB radar and returned after contacting a sound source.

In several embodiments, several frames can be selected for a given fast time ToF thereby obtaining a time series of amplitudes for a particular distance. The particular distance can correspond, in several embodiments, to a single sound source. Thereby, a time series of amplitudes can be identified for an identified sound source. In several embodiments, the identified sound source can be sampled at a UWB audio system frame rate. Based on the sound source sampling, sound-related movement can be recovered from an amplitude of a UWB in-phase or quadrature data. In several embodiments, in-phase or quadrature data can be selected to be used based on a resulting signal quality associated with the in-phase and/or quadrature data. In various embodiments the in-phase or quadrature data will be selected when the selected data provides the higher signal quality, e.g., by having a higher signal-to-noise ratio (SNR).

While specific processes and/or systems for an IR-UWB audio system, any of a variety of processes and/or systems can be utilized for an IR-UWB audio system as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to an IR-UWB audio system, the techniques disclosed herein may be used in any type of signal processing and/or data generating system. The techniques disclosed herein may be used within any of the UWB, radar, UWB audio systems, and/or signal processing systems as described herein.

Figure 6:
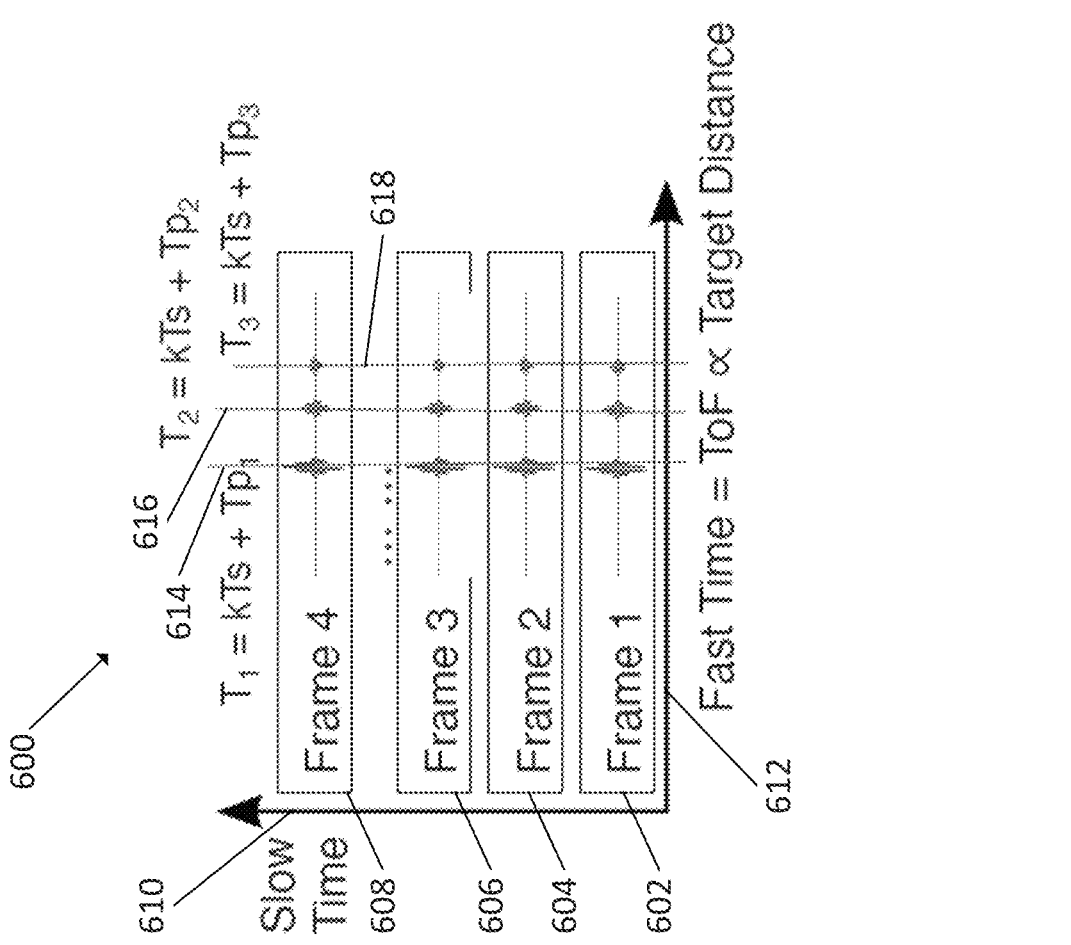
FIG. 6 conceptually illustrates an example data structure including frames in accordance with an embodiment of the invention.

In several embodiments, frames can be generated by IR-UWB audio systems. Frame generation, in various embodiments, can be limited by IR-UWB audio system sampling rates. Each frame can include data based on one or more reflected pulse responses, each pulse response can correspond to an object. An example data structure including frames is conceptually illustrated in FIG. 6. The data structure 600 can include frames, such as first frame 602, second frame 604, third frame 606 and fourth frame 608. The data structure 600 can be a 2D data structure with a first dimension in fast time, and a second dimension in slow time. In accordance with several embodiments of the invention, detected objects corresponding to reflected pulse responses (e.g., backscattered pulses) can correspond to ToF differences in fast time, and detection of audio signals associated with detected objects can correspond to amplitude differences (e.g., amplitude of in-phase or quadrature components) in slow time. Frames can be arranged along a Y-axis 610. The Y-axis 610 can correspond to slow time. The data structure 600 can include an X-axis 612. The X-axis 612 can correspond to fast time. The X-axis 612 can correspond to reflected pulse responses with different time delays. First slice 614, second slice 616, and third slice 618 can correspond to different distance bins. In various embodiments, slices have constant fast time and can include data separated in slow time. Fast time, in accordance with embodiment of the invention, can correspond to ToF ranging to determine distance from a radar (e.g., an IR-UWB radar) to an object).

Slow time, in accordance with embodiment of the invention, can correspond to data obtained over time by sequential pulses emitted and received by a radar (e.g., an IR-UWB radar). In various embodiments, fast time can correspond to a round trip ToF of a pulse. Round ToF of a pulse can be converted, by processes in various embodiments, into distance bins. In several embodiments, multiple targets lying at different distances can be separated by fixating the fast time to a few particular values (e.g., distance bins) representing the round-trip ToFs from a component (e.g., an IR-UWB radar) to an object (e.g., a sound source).

In various embodiments, processes can identify one or more distance bins corresponding to sound sources. Each of one or more sound sources can correspond to one or more distance bins. A sound source can be selected. Based on the selected sound source one or more distance bins can be identified. A slice can be generated based on the identified one or more distance corresponding to the selected sound source. In various embodiments, slices can be generated by obtaining data from one or more frames, the data corresponding to the identified one or more distance bins. In various embodiments, slices from a 2D data structure (e.g., data structure 600) can be taken to obtain a 1D time series (e.g., a time series based on extracting data associated with a single sound source from the series of frames) as an estimation of a sound source. For example, in FIG. 6, each of the first slice 614, second slice 616, and third slice 618 can correspond to difference slices associated with different sound sources. The slices can be separated in the distance bin (e.g., fast time, ToF) domain.

Processes can, in accordance with various embodiments of the invention translate slices into an audible sound. Processes can use complex baseband equivalent processing in IR-UWB radar to perform sensing of sound-related vibrations. In several embodiments, sound waveform values can be proportional to amplitudes of in-phase or quadrature parts of filtered sliced data.

In several embodiments, data collected from the departure of a probe pulse until the arrival of a final probe pulse response can be referred to as a frame. In certain embodiments, frames can be ordered chronologically.

While specific processes and/or systems for a data structure including frames, any of a variety of processes and/or systems can be utilized for a data structure including frames as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to a data structure including frames, the techniques disclosed herein may be used in any type of signal processing and/or data generating system. The techniques disclosed herein may be used within any of the UWB, radar, UWB audio systems, and/or signal processing systems as described herein.

Figure 7:
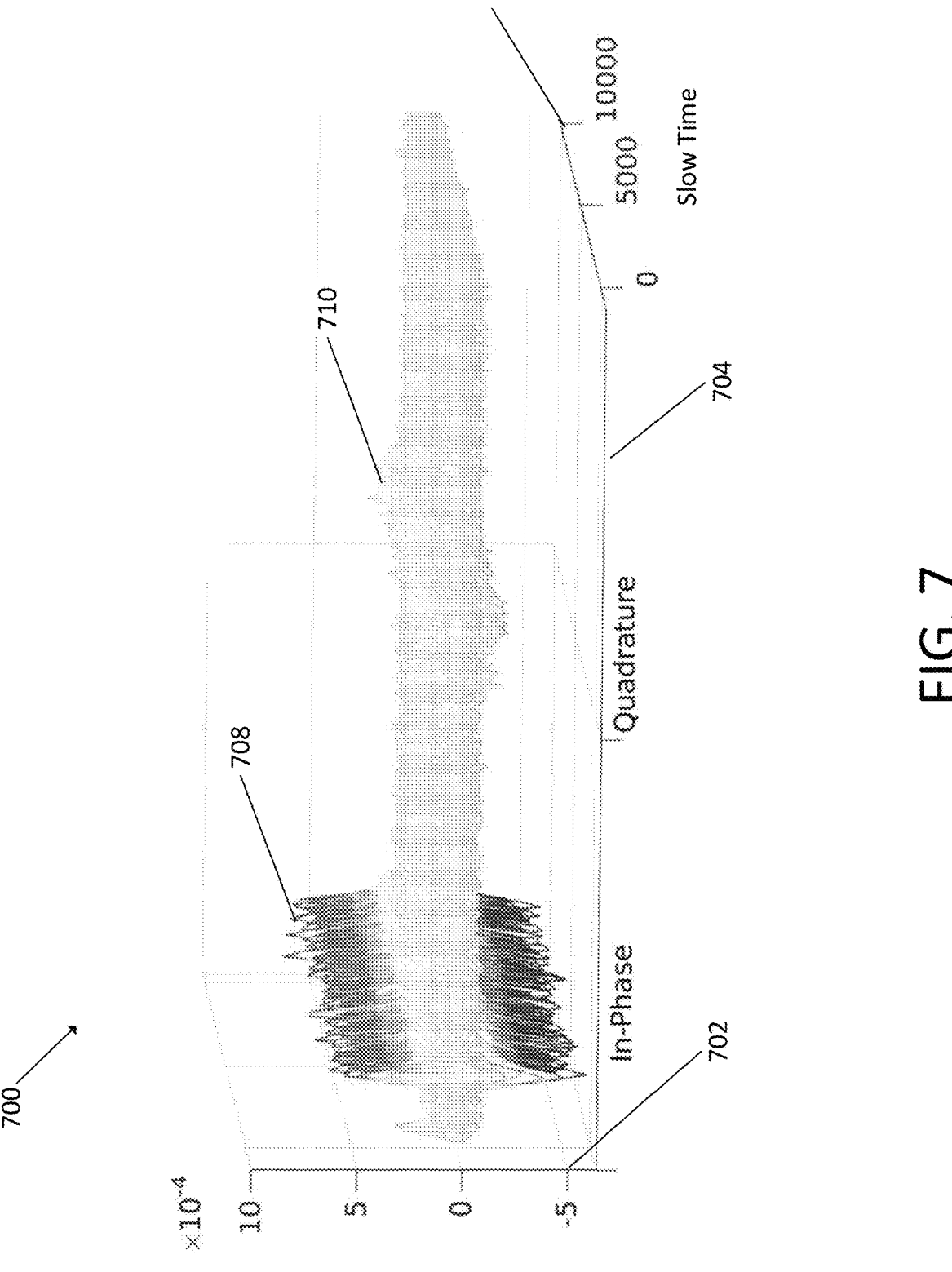
FIG. 7 conceptually illustrates an example of data collection using IR-UWB radar and a sound source in accordance with an embodiment of the invention.

An example of data collection using IR-UWB radar and a sound source, after processing is conceptually illustrated in FIG. 7. The data structure 700 includes a Y-axis 702 corresponding to an amplitude, an X-axis 704 corresponding to in-phase and quadrature components of a received signal after signal processing and a Z-axis 706 corresponding to slow time (e.g., frames). Audio signals can be obtained based on processing in-phase parts (e.g., in-phase part 708) or quadrature parts (e.g., quadrature part 710). In various embodiments, data obtained using an IR-UWB radar can be processed to generate data analogous to the example data of FIG. 7. These processes are discussed in greater detail elsewhere herein. In accordance with several embodiments of the invention, sound-related fluctuations can appear primarily in the amplitude of the in-phase part data (e.g., as shown in FIG. 7) and/or in the quadrature part data.

In various embodiments, processes can extract the sound-related vibration information by analyzing the amplitude of the in-phase or quadrature of UWB received signals. A process can determine whether to analyze in-phase or quadrature signals based on determining which (e.g., which of in-phase or quadrature) provides a higher signal-to-noise-ratio.

While specific processes and/or systems for data collection using an IR-UWB radar and a sound source, any of a variety of processes and/or systems can be utilized for data collection using an IR-UWB radar and a sound source as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to data collection using an IR-UWB radar and a sound source, the techniques disclosed herein may be used in any type of signal processing and/or data generating system. The techniques disclosed herein may be used within any of the UWB, radar, UWB audio systems, and/or signal processing systems as described herein.

Processes for Generating a Frame of Radar Pulse Data

Figure 8:
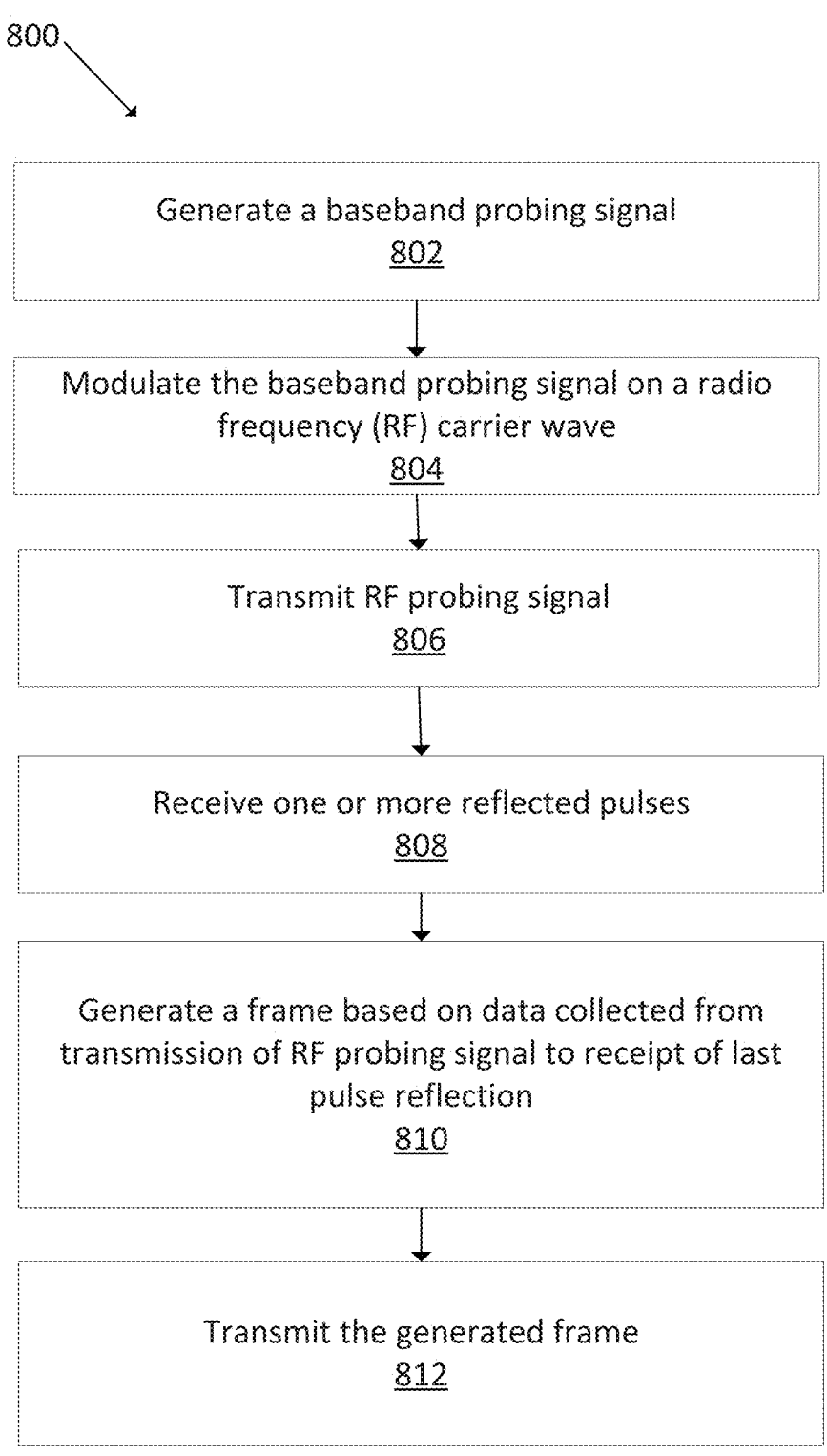
FIG. 8 conceptually illustrates an example process for generating and transmitting a frame containing radar pulse data in accordance with an embodiment of the invention.

Processes can, in accordance with several embodiments, generate frames describing reflected pulses (e.g., backscattered pulses). An example process for generating and transmitting a frame containing reflected radar pulse data is conceptually illustrated in FIG. 8. In accordance with embodiments of the invention, processes for generating and transmitting frames containing reflected radar pulse data can be performed by hardware components such as those hardware components described in connection with FIGS. 1, 2, 3, and/or 4. The process 800 can generate (802) a baseband probing signal. A. The baseband probing signal can be a gaussian pulse. The process 800 can modulate (804) the baseband probing signal on a radio frequency (RF) carrier wave. Modulating the baseband probing signal on an RF carrier wave can generate an RF probing signal. Based on the baseband probing signal an RF probing signal can be transmitted (806). The RF probing signal (e.g., radar signal, UWB radar signal) can be transmitted by a radar (e.g., a UWB radar) in many embodiments. The process 800 can receive (808) one or more reflected probe pulses. In numerous embodiments, the reflected probe pulses (e.g., received signal, received radar signal) can be received by a radar (e.g., a UWB radar). The process 800 can generate (810) a radar pulse data frame based on data collected from transmission of the probe pulse to receipt of a last reflected probe pulse. In accordance with various embodiments of the invention the radar pulse data frame can include data describing one or more probe pulses (e.g., describing the probe pulse transmission time) and/or pulse responses (e.g., the waveform of the pulse responses). The process 800 can transmit (812) the frame. In various embodiments the radar pulse data frame can be transmitted via an SPI to a computing device.

While specific processes and/or systems for generating and transmitting a frame containing radar pulse data, any of a variety of processes and/or systems can be utilized for generating and transmitting a frame containing radar pulse data as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to generating and transmitting a frame containing radar pulse data, the techniques disclosed herein may be used in any type of signal processing and/or data generating system. The techniques disclosed herein may be used within any of the UWB, radar, UWB audio systems, and/or signal processing systems as described herein.

Processes for Separating Sound Sources and Generating Audio Data

Figure 10:
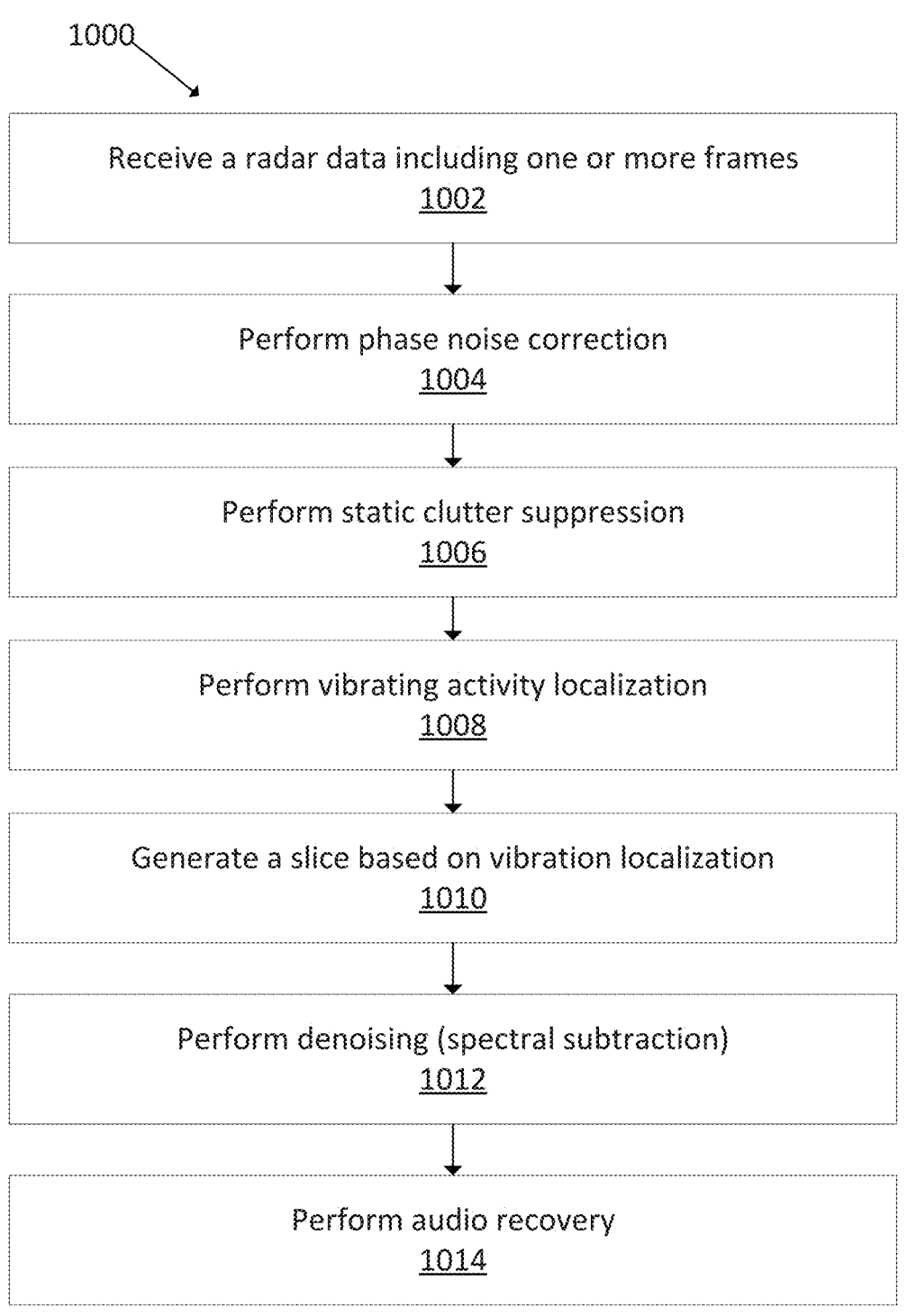
FIG. 10 conceptually illustrates an example of a process for performing audio recovery based on a received slice of one or more frames in accordance with an embodiment of the invention.

In several embodiments, a computing device can receive one or more frames, and based on these frames can generate audio data separated based on sound source. An example process for generating audio data separated based on sound source is conceptually illustrated in FIG. 9. In accordance with embodiments of the invention, processes for generating audio data separated based on sound sources can be performed by hardware components such as those hardware components described in connection with FIGS. 1, 2, 3, and/or 4. The process 900 can receive (902) and accumulate multiple radar pulse data frames. The radar pulse data frames can include data suitable for determining a ToF for one or more objects based on a transmitted probe pulse (e.g., RF probing signals) and a reflected probe pulse. In various embodiments, the radar pulse data frames can be generated in a manner similar to the process 800 described elsewhere herein. The multiple radar pulse data frames can be sliced (904) in the fast time domain (e.g., according to distances, according to ToF) by the process 900. In various embodiments, slicing the frames can generate constant fast time slices (e.g., data with a nearly constant ToF parameter and including data related to one or more probe pulses). Constant fast time slices can be time series that include probe pulse and reflected probe pulse data (e.g., pulse response data) related to a specific ToF, sound source, and/or distance bin. The process 900 can perform (906) filtering and other signal processing steps to the constant fast time slice. In accordance with several embodiments of the invention, filtering and other signal processing can be performed as according to other processes further discussed elsewhere herein (e.g., in relation to FIG. 10). In various embodiments, performing filtering and other signal processing steps can include performing phase noise correction, performing static clutter suppression, performing vibrating activity localization, and/or performing denoising (e.g., spectral subtraction). The process 900 can determine (908) whether the in-phase or quadrature part of a constant fast time slice has a greater signal to noise ratio. Based on determining whether the in-phase part or quadrature part of a constant fast time slice has a greater signal to noise ratio, the process 900 can generate (910) a soundwave that is proportional to the amplitude of a selection of the in-phase part or quadrature, wherein the selected part has the greater signal to noise ratio. The process 900 can output (912) an audio signal based on the generated soundwave. In various embodiments the audio signal corresponds to a specific object and/or sound source.

While specific processes and/or systems for generating audio data separated based on sound source, any of a variety of processes and/or systems can be utilized for generating audio data separated based on sound source as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to generating audio data separated based on sound source, the techniques disclosed herein may be used in any type of signal processing and/or data generating system. The techniques disclosed herein may be used within any of the UWB, radar, UWB audio systems, and/or signal processing systems as described herein.

Processes for Recovering Audio by Signal Processing

In several embodiments, processes can perform audio recovery based on a received data including of one or more radar pulse data frames. An example of a process for performing audio recovery based on a received slice of one or more frames is conceptually illustrated in FIG. 10. In accordance with embodiments of the invention, processes for performing audio recover based on received slices of one or more frames can be performed by hardware components such as those hardware components described in connection with FIGS. 1, 2, 3, and/or 4. The process 1000 can receive (1002) radar data including one or more radar pulse data frames. In various embodiments, each of the one or more frames can correspond to a transmitted probe pulse (e.g., RF probing signals) and associated reflected probe pulses. Phase noise correction can be performed (1004) by the process 1000 on the radar data. The process 1000 can perform (1006) static clutter suppression on the radar data. The process 1000 can perform (1008) vibrating activity localization on the radar data. In several embodiments vibrating activity (e.g., target) localization can identify and/or select distance bins (e.g., fast times) corresponding to sound sources. The process 1000 can generate (1010) one or more constant fast time slices based on the vibrating activity localization. In accordance with many embodiments of the invention, each of the one or more constant fast time slices can correspond to a localized vibrating activity (e.g., a sound source). Denoising and normalization (e.g., spectral subtraction) can be performed (1012) by the process 1000 on the generated constant fast time slice. The process 1000 can perform 1014 audio recovery on the denoised and normalized constant fast time slice. In several embodiments the vibration of a sound source (e.g., a speaker) is proportional to the phase of a received reflected probe pulse. Audio recovery can be performed based on the phase of constant fast time slice of one or more frames. In various embodiments audio recovery can generate an audio file.

Phase Noise Correction

In various embodiments phase noise correction can be applied to radar pulse data frames and/or constant fast time slices. In several embodiments, recovered audio is based on measurements of the amplitude change over time of the in phase or quadrature data caused by sound source vibrations. However, various factors can impede retrieval of the information related to sound vibration. One factor impeding retrieval of the information is phase noise. In some embodiments, phase noise can be introduced due to the imperfection of a signal sampling clock. Imperfections can arise due to crystal defects and/or phase lock loop (PLL) error. In several embodiments constant fast time slices are selected based on the data from one distance bin and then the phase can be analyzed over time to recover audio. In accordance with embodiments of the invention, the phase should remain relatively constant when there are no vibrations at the current bin. However, with phase noise, you can see a rapid change of phase back and forth, which can lead to the system mistakenly believe in the existence of a vibration in this bin.

In several embodiments, the signal amplitude in the first few distance bins is always high due to crosstalk between a transmitting antenna (TX) and a receiving antenna (RX) (e.g., direct signal leakage from the transmitting antenna to the receiving antenna). In several embodiments the crosstalk can be used as a baseline for phase calibration. Using the crosstalk as a baseline for phase calibration can include calculating a mean phase of a first distance bin and using the mean phase of a first distance bin as a standard reference phase. For each radar pulse frame, a phase difference ($\Delta\phi$) between the phase of the first distance bin and the standard reference phase can be determined. Based on phase difference, all samples from a radar pulse frame can be multiplied by $e^{j\Delta\Phi}$ to offset the phase error.

Static Clutter Suppression

In various embodiments a static clutter suppression filter can be applied to radar pulse data frames and/or constant fast time slices. While vibrations can create a unique pattern on the receiving data, static objects like walls and furniture will also reflect UWB pulses and can, in various embodiments, create strong responses. In some cases, the static responses (also know as static clutter) can be so strong that the useful signal is buried underneath. However, in various embodiments, static clutter is usually time-invariant in a select bin. In several embodiments, a Butterworth finite impulse response filter (FIR) can be applied on each distance bin (e.g., constant fast time slice). In various embodiments the FIR filtering can be applied with the stopping frequency at 20 Hz and the passing frequency at 70 Hz. In several embodiments, FIR filtering can be applied to input radar pulse data frames in both the forward and reverse directions to ensure zero phase distortion at the beginning of the radar pulse data frames. In various embodiments a stop-band attenuation can be set at −80 dB.

In several embodiments, a clutter suppression filter is able to remove all the responses caused by static objects, as well as the low-frequency vibrations caused by human movement or human breathing.

Due to the low-pass nature of UWB audio sensing, pre-emphasis can, in some embodiments, be applied as part of static clutter suppression, wherein $y(t)=x(t)-\propto x(t-1)$, where $\propto \in (0.95, 1)$. This difference equation can be equivalent to a high-pass filter that compensates for signal loss in high-frequency ranges.

Sound Source Localization

In various embodiments vibrating target (or activity) localization can be applied to radar pulse data frames and/or constant fast time slices. UWB data (e.g., radar pulse data frames) contain multiple time series (e.g., columns, constant fast time slices) that correspond to different distance bins.

In several embodiments, processes can select candidate bins with high signal-to-noise-ratios (SNR), where SNR is defined as the signal power divided by the noise power. In various embodiments, since the signal can still be noisy in some desired channels, only doing thresholding or calculating variance in the time domain may not give satisfying results. In several embodiments, this problem can be solved in the frequency domain. In accordance with embodiments of the invention, channels (e.g., frames within a certain distance bin, constant fast time slices) with sound vibration information have more concentrated spectrums than noisy channel. For example, music will have basic notes and their higher order harmonics. While human voice power is more widely distributed in the spectrum, we can still observe basic frequencies F0 and their harmonics.

Thus, in several embodiments, performing vibrating activity localization can include performing a Discrete Fourier Transform (DFT) over all channels to get channel spectrums. Then, in accordance with many embodiments of the invention, the Herfindahl-Hirschman index (HHI) can be used to calculate the concentration level of those spectrums. The Herfindahl-Hirschman index was introduced in economic fields as a measure of market concentration. It is calculated by squaring the "market share" of each frequency and then summing the resulting numbers. Here the "market share" can be defined as the power of the current frequency divided by the overall power of the signal time series. In several embodiments, the distance bins with the highest HHIs are selected as the candidates of bins containing vibration information.

Denoising and Normalization

In several embodiments denoising and/or normalization can be applied to radar pulse data frames and/or constant fast time slices. In certain embodiments, after localizing a vibrating target, a process can be capable of acquiring an audio signal estimation by slicing the identified (e.g., identified using target localization as described elsewhere herein) distance bin from the data.

In various embodiments, the audio signal can still contain non-negligible background noise (e.g., which can sound like winds in microphone recordings). In accordance with various embodiments of the invention, the noise can be very close to an Additive White Gaussian Noise (AWGN).

For additive noise, a simple but powerful denoising solution is spectral subtraction (SS). The underlying idea of SS is straightforward. Suppose the signal $x(t)=s(t)+d(t)$, where $s(t)$ is the signal part and $d(t)$ is the noise part. $x(t)$ can be divided into overlapping frames. Then after a fast Fourier transform, the spectrum of noise $\hat{D}(w)$ can be estimated and updated continuously using pure noise frames. The noise spectrum amplitude can then be subtracted from the noisy signal, which can be represented as:

$$|\hat{X}(w)|=\sqrt{|X(w)|^2-|\hat{D}(w)|^2}$$

In accordance with numerous embodiments of the invention, the spectrogram amplitude can then be multiplied with the original phase to get an estimation of the clean signal $s(t)$ (e.g., $\hat{x}(t)$).

In accordance with a number of embodiments of the invention, are linear SS, non-linear SS, and/or multi-band SS can be used. In several embodiments, the output of a SS algorithm can be normalized and output as a .wav file to generate the recovered sound. In various embodiments, a Short Time Fourier Transform (STFT) can be performed on the normalized SS algorithm output to visualize the recovered sound. While specific processes and/or systems for performing audio recovery based on a received radar data including one or more radar pulse data frames, any of a variety of processes and/or systems can be utilized for performing audio recovery based on a received radar data including one or more radar pulse data frames as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to performing audio recovery based on a received radar data including one or more radar pulse data frames, the techniques disclosed herein may be used in any type of signal processing and/or data generating system. The techniques disclosed herein may be used within any of the UWB, radar, UWB audio systems, and/or signal processing systems as described herein.

Practical Applications of Audio Sensing

In several embodiments, UWB audio sensing systems can be used to perform sound source distance measurement. One of the great advantages of using UWB lies in the fine ranging resolution brought by its ultra-wide signal bandwidth. In accordance with embodiments of the invention, UWB audio sensing is distance-aware, which means it can recover the sound-related vibrations, and also can provide ranging on vibrating sources relative to sensors. In several embodiments, sound sources can be located by trilateration using multiple UWB audio sensing systems.

Through-wall acoustic eavesdropping can be performed, in several embodiments using a UWB audio sensing system. In many embodiments, the system can operate without line-of-sight, which enables the system to perform through wall eavesdropping.

In various embodiments, UWB audio sensing systems can perform acoustic feedback in vacuum. The underlying philosophy of acoustic eavesdropping with wireless vibrometry is that, radio frequency wireless signals can penetrate materials, reach the vibrating source directly and come back, without needing mechanical sound waves that need to transmit through mediums. Furthermore, materials that block the sound waves may not necessarily cause trouble for electromagnetic waves, for instance, sound-absorbing foams or a double-layer vacuum glass wall. UWB audio sensing systems can therefore, in various embodiments, be used to provide acoustic feedback in conditions where sound cannot propagate between the source and the detector (e.g., scientific experiments that involve vacuum chamber, or in space missions where sound cannot propagate).

UWB audio sensing systems, in various embodiments can perform sound separation. UWB audio sensing systems can separate sounds in UWB fast time domain. In several embodiments, UWB audio sensing systems can handle multiple simultaneous sounds occurring at different distances, and separate them apart based on the time-of-flight (or fast time).

Furthermore, UWB audio sensing systems can provide sound recovery from tools (e.g., household tools). In several embodiments the system can recover audio signals indicated the speed, the start, and the end phase of tools and other vibrating system.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

In several embodiments, UWB audio systems can provide a robust audio sensing interface for Sound Event Detection and Classification (SEDC). UWB audio systems can, in several embodiments collect multi-track source-separated audio to detect appliance use and/or human physical activities to generate onset and offset time estimations. SEDC with UWB audio system can, in various embodiments, provide the ability to monitor several machines and devices' functionality. UWB audio systems can detect abnormal vibrations or early failures. In many embodiments, a system combining LiDAR systems and UWB audio systems can tag objects with vibration signatures that can enable classifying vehicles and human activities.

In many embodiments, spatial audio generated from UWB audio systems can cooperate with RF activity sensing systems and be used to understand complex events and human behaviors. IR-UWB radar technologies can be incorporated on mobile platforms like smartphones to make rich inferences using audio-related vibrations.

What is claimed is:

1. A device for generating an audio signal based on audio source ranging using ultrawideband signals, the device comprising:

a transmitter circuitry;

a receiver circuitry;

memory; and a processor, the processor configured to:

generate a radio signal comprising an ultra-wideband Gaussian pulse modulated on a radio-frequency carrier and transmit the radio frequency signal using the transmitter circuitry;

receive one or more backscattered signals at the receiver circuitry;

demodulate the one or more backscattered signals to generate one or more baseband signals, wherein generating one or more baseband signals comprises generating an in-phase component and a quadrature component, and wherein the set of frames is generated based on a highest spectrum concentration component, the component selected from a list of the in-phase component and the quadrature component;

generate a set of data frames based on the one or more baseband signals, wherein a data frame of the set of data frames is a time series generated based on backscattered signal data collected during a time interval, wherein the time interval is defined as a period from a transmission of the radio signal to a receipt of a last backscattered signal;

determine one or more distance bins associated with the one or more backscattered signals based on the set of data frames;

generate a slice based on a selected distance bin, the selected distance bin selected from among the determined one or more distance bins, wherein the slice includes a selected portion of the data from the set of frames, the portion of the data selected corresponds to the selected distance bin, the data defining a slice waveform; and generate a sound waveform based on the generated slice.

2. The device of claim 1, wherein generating one or more baseband signals comprises generating an in-phase component and a quadrature component.

3. The device of claim 1, wherein the generated sound waveform has an amplitude proportional to an amplitude of the slice waveform associated with the generated slice.

4. The device of claim 1, wherein determining one or more distances associated with the one or more backscattered signals based on the set of frames comprises determining a time of flight for each of the one or more backscattered signals.

5. The device of claim 1, wherein the radio signal is an ultrawideband signal.

6. The device of claim 1, wherein the radio signal is an impulse radio ultrawideband signal.

7. The device of claim 1, wherein the transmitter circuitry is configured to transmit signals using an impulse radio ultra-wideband.

8. The device of claim 1, wherein the transmitter circuitry is configured to transmit a discontinuous wireless pulse signal.

9. The device of claim 1, wherein the transmitter circuitry is configured to use a sub 10 GHz range.

10. The device of claim 1, wherein the set of frames is a two-dimensional data structure.

11. The device of claim 1, wherein the slice is a one-dimensional data structure.

12. The device of claim 1, wherein generating a sound waveform based on the slice comprises generating a waveform having an amplitude proportional to the amplitude of a waveform described by data included in the slice.

13. The device of claim 1, wherein generating a sound waveform based on the slice comprises generating a waveform having an amplitude proportional to an amplitude of an in-phase part of the slice waveform.

14. The device of claim 1, wherein generating a sound waveform based on the slice comprises generating a waveform having an amplitude proportional to an amplitude of a quadrature part of the slice waveform.

15. The device of claim 1, wherein generating a sound waveform based on the slice comprises generating a waveform having an amplitude proportional to the amplitude of a waveform generated based on filtering the slice.

16. The device of claim 1, wherein the processor is further configured to perform a phase noise correction on the set of data frames, wherein performing the phase noise correction comprises:

generating a reference slice based on the set of data frames, the reference slice corresponding to a first distance bin, wherein the first distance bin is a closest distance bin to the transmitter circuitry;

determining a standard reference phase based on the reference slice; and for each data frame of the set of data frames:

determining a phase difference between a data frame first distance bin and the determined standard reference phase; and offsetting a phase error for all samples in the data frame based on the determined phase difference.

17. The device of claim 16, wherein calculating a standard reference phase based on the reference slice comprises calculating a mean phase of the reference slice.

18. The device of claim 16, wherein offsetting the phase error for all samples in the data frame comprises multiplying all samples in the data frame by $e^{j\Delta\phi}$, where e is Euler's number, j is a constant, and $j\Delta\phi$ is the determined phase difference.

19. The device of claim 1, wherein the processor is further configured to perform a static clutter suppression on the set of data frames, wherein performing the static clutter suppression comprises:

applying a Butterworth finite impulse response filter (FIR) on each distance bin, each distance bin corresponding to a distance bin portion of data from the set of data frames.

20. The device of claim 19, wherein the FIR is applied with a stopping frequency at 20 Hz.

21. The device of claim 19, wherein the FIR is applied with a passing frequency at 70 Hz.

22. The device of claim 19, wherein the FIR is applied using a stop-band attenuation set at −80 dB.

23. The device of claim 19, wherein performing static clutter suppression further comprises applying a high-pass filter.

24. The device of claim 1, wherein the processor is further configured to perform a vibrating activity localization on the set of data frames, wherein performing the vibrating activity localization comprises:

performing a discrete Fourier transform over each distance bin to generate a spectrum for each distance bin, each distance bin corresponding to a distance bin portion of data from the set of data frames;

generating a Herfindahl-Hirschman index for each distance bin based on the generated spectrums; and selecting those distance bins which correspond to Herfindahl-Hirschman indices exceeding a threshold value.

25. The device of claim 1, wherein the processor is further configured to perform a denoising on the generated slice, wherein the denoising comprises:

applying spectral subtraction on the generated slice; and applying a normalization on an output of the spectral subtraction.

26. The device of claim 25, wherein the applied spectral subtraction is an algorithm selected from the list of linear spectral subtraction, non-linear spectral subtraction, and multi-band spectral subtraction.

27. The device of claim 1, wherein the processor is further configured to perform audio recovery on the generated slice, wherein the audio recovery comprises:

outputting an audio file based on the generated slice.

28. The device of claim 1, wherein each frame of the set of frames is associated with the transmission of an RF probe pulse.

\* \* \* \* \*